United States Patent
Komori

(10) Patent No.: US 11,074,916 B2
(45) Date of Patent: Jul. 27, 2021

(54) INFORMATION PROCESSING SYSTEM, AND INFORMATION PROCESSING METHOD

(71) Applicant: SONY CORPORATION, Tokyo (JP)

(72) Inventor: Akihiro Komori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/936,336

(22) Filed: Jul. 22, 2020

(65) Prior Publication Data

US 2020/0388281 A1    Dec. 10, 2020

Related U.S. Application Data

(63) Continuation of application No. 16/707,832, filed on Dec. 9, 2019, now Pat. No. 10,777,199, which is a
(Continued)

(30) Foreign Application Priority Data

May 6, 2016    (JP) .................................. 2016-093352

(51) Int. Cl.
*H04M 3/42*    (2006.01)
*G10L 15/22*    (2006.01)
(Continued)

(52) U.S. Cl.
CPC ................. *G10L 15/22* (2013.01); *G06F 3/16* (2013.01); *G06F 16/00* (2019.01);
(Continued)

(58) Field of Classification Search
CPC ......... G10L 15/22; G10L 15/30; G10L 15/10; G10L 13/00; G10L 25/78; G06F 16/00;
(Continued)

(56) References Cited

U.S. PATENT DOCUMENTS 4,945,557 A * 7/1990 Kaneuchi .............. H04M 1/271
379/88.03
5,675,707 A   10/1997 Gorin
(Continued)

FOREIGN PATENT DOCUMENTS

JP    2002-82873 A    3/2002
JP    2005-313886 A    10/2005
(Continued)

OTHER PUBLICATIONS

International Search Report dated Apr. 11, 2017, in PCT/JP2017/003845, filed Feb. 2, 2017.

*Primary Examiner* — Md S Elahee
(74) *Attorney, Agent, or Firm* — Oblon, McClelland, Maier & Neustadt, L.L.P.

(57) ABSTRACT

The present disclosure provides an information processing system and an information processing method capable of auditing the utterance data of an agent more flexibly. In one example, an information processing system includes: a storage section that stores utterance data of an agent; a communication section that receives request information transmitted from a client terminal and requesting utterance data of a specific agent from a user; and a control section that, when the request information is received through the communication section, replies to the client terminal with corresponding utterance data, and in accordance with feedback from the user with respect to the utterance data, updates an utterance probability level expressing a probability that the specific agent will utter utterance content indicated by the utterance data, and records the updated utterance probability level in association with the specific agent and the utterance content in the storage section.

20 Claims, 28 Drawing Sheets

| AGENT ID | UTTERANCE | TRIGGER | UTTERANCE PROBABILITY LEVEL | UTTERABLE FLAG |
|---|---|---|---|---|
| CHARACTER A | GOOD MORNING | USER-SET WAKEUP TIME | 1.0 | true |
| CHARACTER A | GOOD MORNING, WAKE UP | USER-SET WAKEUP TIME | 0.8 | true |
| CHARACTER A | GET UP | USER-SET WAKEUP TIME | 0.5 | true |
| CHARACTER A | GOOD MORNING TO YOU | USER-SET WAKEUP TIME | 0.7 | true |
| CHARACTER A | WOULD YOU BE SO KIND AS TO WAKE UP | USER-SET WAKEUP TIME | 0.2 | true |
| CHARACTER A | GET THE HELL UP | USER-SET WAKEUP TIME | 0.4 | false |
| CHARACTER A | IT'S NOON | 12:00 | 0.9 | true |
| CHARACTER A | NOON | 12:00 | 0.8 | true |
| CHARACTER A | IT IS NOON | 12:00 | 0.5 | true |
| CHARACTER A | IT IS 12 O'CLOCK | 12:00 | 0.5 | true |
| CHARACTER A | YO IT'S LUNCHTIME | 12:00 | 0.4 | false |
| CHARACTER A | CHEER UP | EMOTION: DISCOURAGED | 0.9 | true |
| CHARACTER A | DO YOUR BEST | EMOTION: DISCOURAGED | 0.8 | true |
| CHARACTER A | I KNOW YOU CAN DO IT | EMOTION: DISCOURAGED | 0.6 | true |
| CHARACTER A | PLEASE DO YOUR BEST | EMOTION: DISCOURAGED | 0.4 | true |

UTTERANCE DATA

Related U.S. Application Data continuation of application No. 16/092,049, filed as application No. PCT/JP2017/003845 on Feb. 2, 2017, now Pat. No. 10,559,305.

(51) Int. Cl.
*G06N 3/00* (2006.01)
*G06F 16/00* (2019.01)
*G06F 16/332* (2019.01)
*G06F 3/16* (2006.01)
*G10L 15/30* (2013.01)
*G10L 25/78* (2013.01)

(52) U.S. Cl.
CPC ........... *G06F 16/3329* (2019.01); *G06N 3/00* (2013.01); *G10L 15/30* (2013.01); *G10L 25/78* (2013.01); *G10L 2025/786* (2013.01)

(58) Field of Classification Search
CPC ......... G06F 16/3329; G06F 3/16; G06N 3/00; H04L 65/40
USPC ..................................... 379/88.01–88.04; 1/1
See application file for complete search history.

(56) References Cited

U.S. PATENT DOCUMENTS

| | | | |
|---|---|---|---|
| 8,977,547 | B2 | 3/2015 | Yamazaki |
| 9,165,556 | B1 * | 10/2015 | Sugar ..................... G10L 15/00 |
| 2008/0147397 | A1 | 6/2008 | Konig |
| 2015/0095420 | A1 * | 4/2015 | Haun .................... H04L 65/403 |
| | | | 709/204 |

FOREIGN PATENT DOCUMENTS

| | | | |
|---|---|---|---|
| JP | 2006-39881 | | 2/2006 |
| JP | 2009-201765 | A | 9/2009 |
| JP | 2009-258918 | A | 11/2009 |
| JP | 2010-533006 | A | 10/2010 |
| JP | 2011-502307 | A | 1/2011 |
| JP | 2013-533537 | A | 8/2013 |
| JP | 2015-49578 | A | 3/2015 |
| JP | 6583765 | B2 * | 10/2019 ............ G10L 15/10 |

\* cited by examiner

300(31, 32, 33, 34): DIALOGUE PROCESSING SECTION

FIG. 13

| AGENT ID | QUESTION | ADVERTISEMENT CONTENT | CONDITIONS ETC. | PROBABILITY 0-1 |
|---|---|---|---|---|
| CHARACTER A | "CHOCOLATE" | "THE NEW CHOCOLATE ON SALE FROM BB CO. CONTAINS A LOT OF MILK AND IS DELICIOUS" | USER IS UNDER 30 | 0.5 |
| CHARACTER A, PERSON B | "I WANT TO EAT SOMETHING DELICIOUS" | "THEY SAY THE BARBECUE AT CC IS DELICIOUS" | YEAR-END PARTY SEASON (DECEMBER) | 0.5 |
| ALL | "I'M THIRSTY" | "AA WATER (PRODUCT NAME) IS GOOD FOR QUENCHING THIRST" | — | 0.1 |

621

USER INFORMATION

| USER ID | PASSWORD | AGENT FAN CLUB MEMBER FLAG |
|---|---|---|
| USER 111 | ******** | false |
| USER 112 | ******** | true |
| USER 113 | ******** | false |
| USER 114 | ******** | false |
| USER 115 | ******** | true |

FIG. 17

AGENT INFORMATION

| AGENT ID | AGENT IMAGE |
|---|---|
| CHARACTER A | IMAGE A |
| PERSON B | IMAGE B |
| PERSON C | IMAGE C |
| CHARACTER D | IMAGE D |
| CHARACTER E | IMAGE E |
| ... | ... |

FIG. 18

UTTERANCE DATA

| AGENT ID | UTTERANCE | TRIGGER | UTTERANCE PROBABILITY LEVEL | UTTERABLE FLAG |
|---|---|---|---|---|
| CHARACTER A | GOOD MORNING | USER-SET WAKEUP TIME | 1.0 | true |
| CHARACTER A | GOOD MORNING, WAKE UP | USER-SET WAKEUP TIME | 0.8 | true |
| CHARACTER A | GET UP | USER-SET WAKEUP TIME | 0.5 | true |
| CHARACTER A | GOOD MORNING TO YOU | USER-SET WAKEUP TIME | 0.7 | true |
| CHARACTER A | WOULD YOU BE SO KIND AS TO WAKE UP | USER-SET WAKEUP TIME | 0.2 | true |
| CHARACTER A | GET THE HELL UP | USER-SET WAKEUP TIME | 0.4 | false |
| CHARACTER A | IT'S NOON | 12:00 | 0.9 | true |
| CHARACTER A | NOON | 12:00 | 0.8 | true |
| CHARACTER A | IT IS NOON | 12:00 | 0.5 | true |
| CHARACTER A | IT IS 12 O'CLOCK | 12:00 | 0.5 | true |
| CHARACTER A | YO IT'S LUNCHTIME | 12:00 | 0.4 | false |
| CHARACTER A | CHEER UP | EMOTION: DISCOURAGED | 0.9 | true |
| CHARACTER A | DO YOUR BEST | EMOTION: DISCOURAGED | 0.8 | true |
| CHARACTER A | I KNOW YOU CAN DO IT | EMOTION: DISCOURAGED | 0.6 | true |
| CHARACTER A | PLEASE DO YOUR BEST | EMOTION: DISCOURAGED | 0.4 | true |

FIG. 19

PRIVILEGED USER INFORMATION

| AGENT ID | PASSWORD | PRIVILEGED USER ID |
|---|---|---|
| CHARACTER A | * * * * * * * | USER 131 |
| PERSON B | * * * * * * * | USER 152 |
| PERSON C | * * * * * * * | USER 144 |
| CHARACTER D | * * * * * * * | USER 217 |
| CHARACTER E | * * * * * * * | USER 372 |
| ... | ... | ... |

FIG. 26

```
                                                                    110
  ┌─────────────────────────────────────────────────────────────────┐
  │ GENERAL USER AUDITING SCREEN                                    │
  │                              112     113                        │
  │  (GENERAL USER ID)    PASSWORD    LOGIN                         │
  │                                                                 │
  │  SELECT AGENT ID  ▽ │ UTTERANCE │ TRIGGER │ UTTERANCE          │
  │                     │           │         │ PROBABILITY LEVEL  │
  │                     │    ―      │   ―     │      ―             │
  │                                                                 │
  │                                                                 │
  │                            FINISH                               │
  └─────────────────────────────────────────────────────────────────┘
```

111 — (GENERAL USER ID)

FIG. 27

| | | | |
|---|---|---|---|
| GENERAL USER AUDITING SCREEN | | | 110a |
| (GENERAL USER ID) | ***** LOGIN | | 115 |
| SELECT AGENT ID ▽ | UTTERANCE | TRIGGER | UTTERANCE PROBABILITY LEVEL |
| CHARACTER A | GOOD MORNING | USER-SET WAKEUP TIME | |
| PERSON B | GOOD MORNING, WAKE UP | USER-SET WAKEUP TIME | |
| PERSON C | GET UP | USER-SET WAKEUP TIME | |
| CHARACTER D | GOOD MORNING TO YOU | USER-SET WAKEUP TIME | |
| CHARACTER E | WOULD YOU BE SO KIND AS TO WAKE UP | USER-SET WAKEUP TIME | |
| ... | GET THE HELL UP | USER-SET WAKEUP TIME | |
| | IT'S NOON | 12:00 | |
| | NOON | 12:00 | |
| | IT IS NOON | 12:00 | |
| | IT IS 12 O'CLOCK | 12:00 | |
| | YO IT'S LUNCHTIME | 12:00 | |
| | CHEER UP | EMOTION, DISCOURAGED | |
| | DO YOUR BEST | EMOTION, DISCOURAGED | |
| | I KNOW YOU CAN DO IT | EMOTION, DISCOURAGED | |
| | PLEASE DO YOUR BEST | EMOTION, DISCOURAGED | |
| | (NEW) | (NEW) | |
| | (NEW) | (NEW) | |

114 (pointing to agent ID column)

FINISH — 116

FIG. 29

| | | | |
|---|---|---|---|
| PRIVILEGED USER AUDITING SCREEN | | | ~120 |

121 — (PRIVILEGED USER ID)  122 — (PASSWORD)  123 — LOGIN

124 — SELECT AGENT ID ▽
- CHARACTER A
- PERSON B

| UTTERANCE | TRIGGER | UTTERABLE FLAG (125) |
|---|---|---|
| GOOD MORNING | USER-SET WAKEUP TIME | ☑ |
| GOOD MORNING, WAKE UP | USER-SET WAKEUP TIME | ☑ |
| GET UP | USER-SET WAKEUP TIME | ☑ |
| GOOD MORNING TO YOU | USER-SET WAKEUP TIME | ☑ |
| WOULD YOU BE SO KIND AS TO WAKE UP | USER-SET WAKEUP TIME | ☑ |
| GET THE HELL UP | USER-SET WAKEUP TIME | ☐ |
| IT'S NOON | 12:00 | ☑ |
| NOON | 12:00 | ☑ |
| IT IS NOON | 12:00 | ☑ |
| IT IS 12 O'CLOCK | 12:00 | ☑ |
| YO IT'S LUNCHTIME | 12:00 | ☐ |
| CHEER UP | EMOTION: DISCOURAGED | ☑ |
| DO YOUR BEST | EMOTION: DISCOURAGED | ☑ |
| I KNOW YOU CAN DO IT | EMOTION: DISCOURAGED | ☑ |
| PLEASE DO YOUR BEST | EMOTION: DISCOURAGED | ☑ |

FINISH — 126

INFORMATION PROCESSING SYSTEM, AND INFORMATION PROCESSING METHOD

CROSS-REFERENCE TO RELATED APPLICATIONS

This application is a continuation application of U.S. application Ser. No. 16/707,832, filed Dec. 9, 2019, which is a continuation application of U.S. application Ser. No. 16/092,049, filed Oct. 8, 2018, which is a National Stage of PCT/JP2017/003845, filed Feb. 2, 2017, which claims priority benefit of Japanese Application No. 2016-093352, filed May 6, 2016. The entire contents of U.S. application Ser. No. 16/707,832 and U.S. application Ser. No. 16/092,049 are incorporated herein by reference.

TECHNICAL FIELD

The present disclosure is an information processing system, and an information processing method.

BACKGROUND ART

In recent years, advances in communication technologies have led to the frequent exchange of messages over networks. Using an information processing terminal such as a smartphone, a mobile phone terminal, or a tablet terminal, a user is able to check messages transmitted from other terminals, and transmit messages.

Also, an agent system that automatically responds to user messages on an information processing terminal has been proposed. In such a system, utterance data of the agent is created collectively by a supervisor or a specialist to some degree, and registered under the supervision of a different specialist.

With regard to such supervision of gesture utterance data or the like, for example, Patent Literature 1 below describes recognizing and determining a gesture displayed by an avatar to be a prohibited gesture, and then changing the prohibited gesture to other image data, and erasing speech data generated by the user while performing the prohibited gesture. Also, with regard to customizable avatar gestures, Patent Literature 2 below describes limiting the use of offensive, rude, or otherwise inappropriate gestures. Also, Patent Literature 3 below describes notifying a moderating entity when inappropriate behavior by an online user is detected. Also, Patent Literature 4 below describes checking whether input text superimposed onto an avatar used for a service screen includes prohibited language. Also, in Patent Literature 5, in the case in which an action is determined to be unpleasant in a raising-type character program, image data for display of the gesture is changed. Furthermore, Patent Literature 6 below describes an anthropomorphic agent who learns and grows, and whose appearance and voice are selected according to the preferences of the driver of a vehicle.

CITATION LIST

Patent Literature

Patent Literature 1: JP 2013-533537T
Patent Literature 2: JP 2010-533006T
Patent Literature 3: JP 2011-502307T
Patent Literature 4: JP 2009-258918A
Patent Literature 5: JP 2009-201765A
Patent Literature 6: JP 2005-313886A

DISCLOSURE OF INVENTION

Technical Problem

However, when supervising the utterance data of an agent, with technologies like those described above, only a binary decision of whether or not to remove utterance data that includes prohibited language can be made, and flexible handling that accounts for the character of the agent is not possible. Also, in the case of supervision by a specialist, from the perspective of work efficiency and scheduling, data can only be processed in units which are aggregated to some degree, and achieving a rich set of utterance data takes enormous time and effort.

Accordingly, the present disclosure proposes an information processing system and an information processing method capable of auditing the utterance data of an agent more flexibly.

Solution to Problem

According to the present disclosure, there is proposed an information processing system including: a storage section that stores utterance data of an agent; a communication section that receives request information transmitted from a client terminal and requesting utterance data of a specific agent from a user; and a control section that, when the request information is received through the communication section, replies to the client terminal with corresponding utterance data, and in accordance with feedback from the user with respect to the utterance data, updates an utterance probability level expressing a probability that the specific agent will utter utterance content indicated by the utterance data, and records the updated utterance probability level in association with the specific agent and the utterance content in the storage section.

According to the present disclosure, there is proposed an information processing method, executed by a processor, including: storing utterance data of an agent in a storage section; receiving, by a communication section, request information transmitted from a client terminal and requesting utterance data of a specific agent from a user; and executing control such that, when the request information is received through the communication section, the client terminal is replied to with corresponding utterance data, and in accordance with feedback from the user with respect to the utterance data, an utterance probability level expressing a probability that the specific agent will utter utterance content indicated by the utterance data is updated, and the updated utterance probability level is recorded in association with the specific agent and the utterance content in the storage section.

Advantageous Effects of Invention

According to the present disclosure as described above, it becomes possible to audit the utterance data of an agent more flexibly.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 13 is a diagram illustrating an example of advertisement information registered in an advertisement DB according to the present embodiment.

FIG. 17 is a diagram illustrating an example of agent information stored in an agent information DB according to the present embodiment.

FIG. 18 illustrates an example of privileged user information stored in a privileged user information DB according to the present embodiment.

FIG. 19 illustrates an example of privileged user information stored in a privileged user information DB according to the present embodiment.

FIG. 26 is a diagram illustrating an example of a general user auditing screen according to the present embodiment.

FIG. 27 is a diagram illustrating an example of a general user auditing screen according to the present embodiment.

FIG. 29 is a diagram illustrating an example of a privileged user auditing screen according to the present embodiment.

MODE(S) FOR CARRYING OUT THE INVENTION

Figure 1:
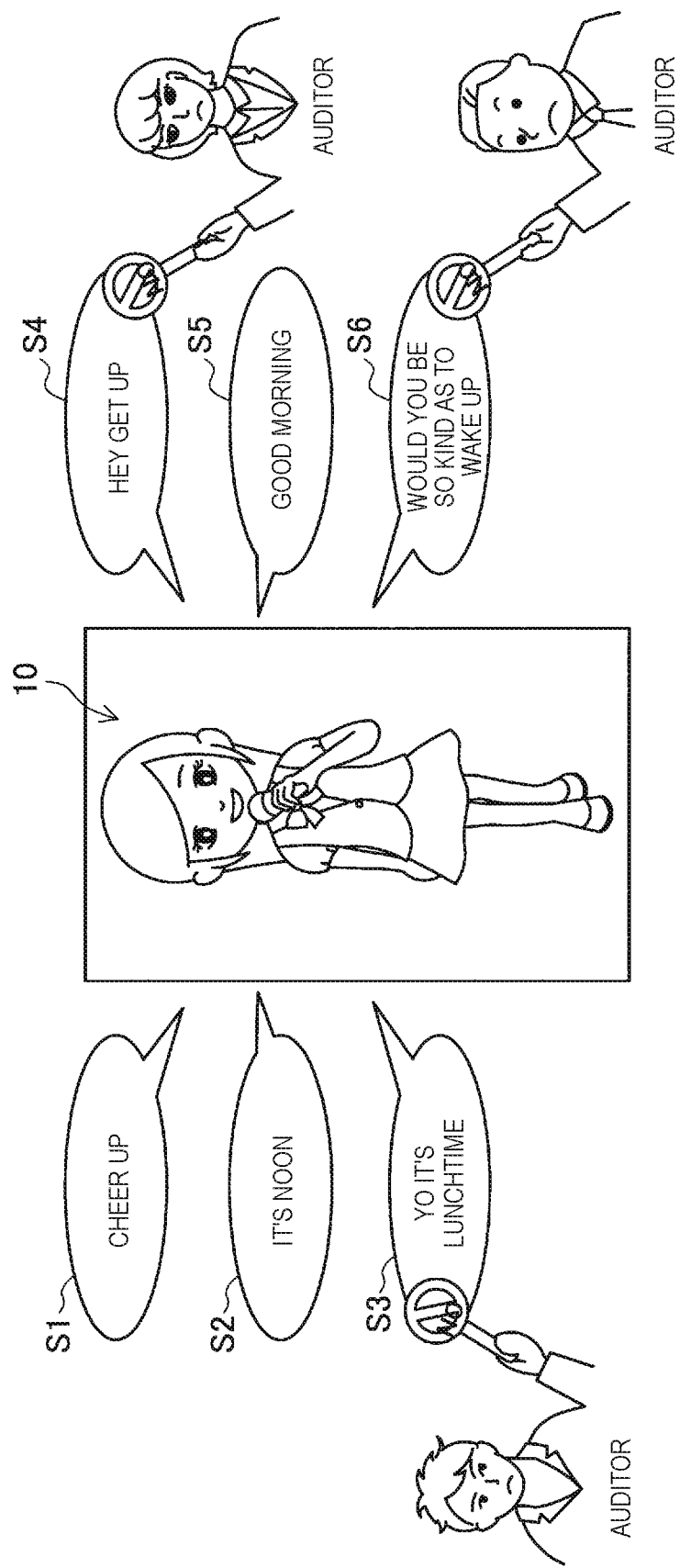
FIG. 1 is a diagram explaining a summary of a communication control system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

1. Summary of communication control system according to embodiment of present disclosure
2. Configuration
   2-1. System configuration
   2-2. Server configuration
3. System operating processes
   3-1. Conversation data registration process
   3-2. Phoneme DB generation process
   3-3. Dialogue control process
   3-4. Conversation DB update process
   3-5. Advertisement insertion process
4. Utterance data management
   4-1. Configuration
      4-1-1. Configuration of conversation DB generation section
      4-1-2. Configuration of dialogue processing section
   4-2. Operating processes
      4-2-1. Collection process
      4-2-2. Auditing process
      4-2-3. Utterance control process
5. Conclusion

1. Summary of Communication Control System According to Embodiment of Present Disclosure A communication control system (agent system) according to an embodiment of the present disclosure will be described with reference to FIG. 1.

FIG. 1 is a diagram explaining a summary of the communication control system according to an embodiment of the present disclosure. In this system, by auditing the utterance data of an agent having a personality who engages in everyday dialogue with a user, the agent can be configured not to produce utterances that do not fit the agent's personality or utterances that include prohibited words. The agent engages in everyday dialogue with the user as described above, and provides a variety of services depending on the situation, such as providing recommendations about the real world, content on the Internet, or the like, providing information such as news, weather forecasts, and the like, providing games, giving directions, and the like. Dialogue with the agent is performed via a display section, microphone, and speaker of a client terminal 1 such as a smartphone possessed by the user, for example. For example, an image of the agent and conversation text is displayed on the display section, and uttered speech of the agent is played back from the speaker. Also, uttered speech of the user is picked up by the microphone and subjected to speech recognition and semantic analysis on the system side. The agent who engages in dialogue with the user is voluntarily selected and purchased by the user from among multiple agents having respectively different personalities (characters) prepared in advance on the system side.

BACKGROUND

The utterance data of an agent needs to be registered in advance. Here, it is possible to enrich an utterance database (DB) more quickly by collecting utterance data from general users, but there is a risk that utterances which do not fit the impression of the agent, utterances that include words contrary to public order and morals, and the like may be registered, and supervision by a specialist is necessary. In the case of supervision by a specialist, from the perspective of work efficiency and scheduling, data can only be processed in units which are aggregated to some degree, and achieving a rich set of utterance data takes enormous time and effort.

Also, when supervising the utterance data of an agent, only a binary decision of whether or not to remove utterance data that includes prohibited language can be made, and flexible handling that accounts for the character of the agent has not been possible.

Accordingly, in the present disclosure, an utterance probability level indicating the degree to which an agent is likely to say something is set with respect to collected utterance data, making it possible to audit the utterance data of an agent more flexibly. With this arrangement, it becomes possible to collect utterance data from general users to enrich the utterance DB, while also causing utterance data which does not fit the impression of the character of an agent not to be used.

Note that the communication control system according to the present embodiment is not limited to a speech agent that responds by speech, and may also be a text-supporting agent that responds in a text-based manner on the client terminal, such as a smartphone.

Also, the communication control system according to the present embodiment may be installed in an information processing apparatus such as a smartphone, a tablet terminal, or a PC, and may also be built into a home system, an in-vehicle system, or a client-server system including a client terminal and a server. In addition, the communication control system according to the present embodiment may also be installed in an anthropomorphic device, such as a robot. In the case of a robot, in addition to speech dialogue, expression control and action control may also be executed.

2. Configuration

<2-1. System Configuration>

Figure 2:
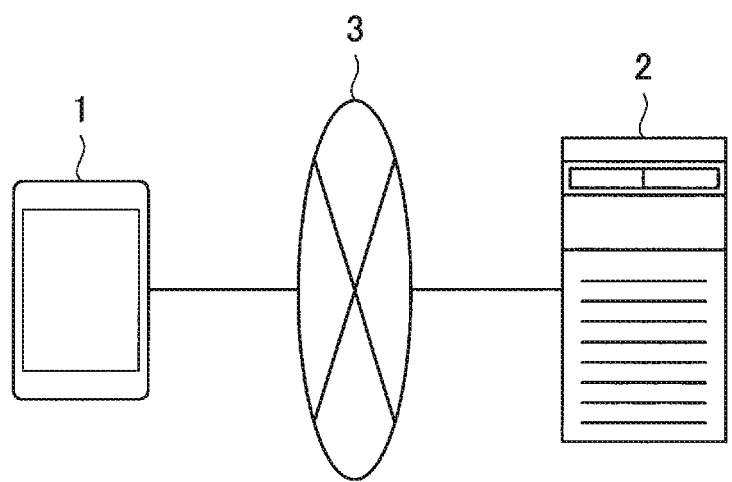
FIG. 2 is a diagram illustrating the overall configuration of the communication control system according to the present embodiment.

Next, an overall configuration of the communication control system according to the present embodiment described above will be described with reference to FIG. 2. FIG. 2 is a diagram illustrating the overall configuration of the communication control system according to the present embodiment.

As illustrated in FIG. 2, the communication control system according to the present embodiment includes a client terminal 1 and an agent server 2.

The agent server 2 connects to the client terminal 1 through a network 3, transmitting and receiving data. Specifically, the agent server 2 generates response speech with respect to uttered speech collected and transmitted by the client terminal 1, and transmits the response speech to the client terminal 1. The agent server 2 includes a phoneme database (DB) corresponding to one or more agents, and is capable of generating response speech in the voice of a specific agent. Herein, the agents may be characters from a comic book, anime, game, drama, movie, or the like, person such as celebrities, historical figures, or the like, but may also be average persons of different generations, without being specific individuals, for example. Additionally, the agents may also be animals or anthropomorphic characters. Additionally, the agents may also be a person reflecting the personality of the user oneself, or persons reflecting the personality of the user's friends, family members, acquaintances, or the like.

Also, the agent server 2 is capable of generating response content reflecting the personality of each agent. Through the agent, the agent server 2 may a variety of services through dialogue with the user, such as management of the user's schedule, the transmission and reception of messages, and information provision.

Note that the client terminal 1 is not limited to a smartphone as illustrated in FIG. 2, and may also be, for example, a mobile phone terminal, a tablet terminal, a personal computer (PC), a game console, a wearable terminal (such as smart eyeglasses, a smart band, a smart watch, or a smart neckband), or the like. Additionally, the client terminal 1 may also be a robot.

The above describes a summary of the communication control system according to the present embodiment. Next, the configuration of the agent server 2 of the communication control system according to the present embodiment will be described specifically with reference to FIG. 3.

<2-2. Agent Server 2>

Figure 3:
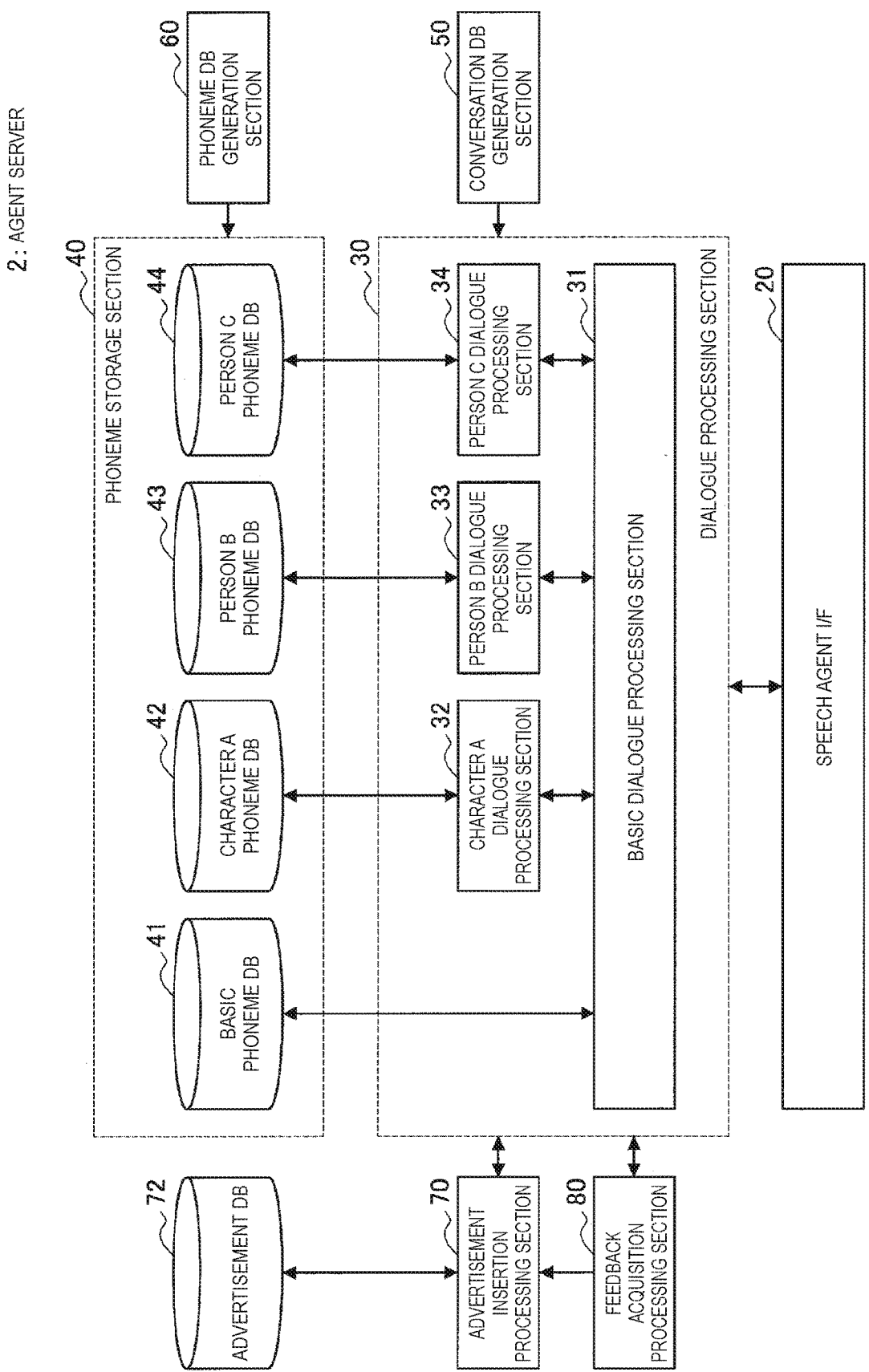
FIG. 3 is a block diagram illustrating an example of a configuration of a speech agent server according to the present embodiment.

FIG. 3 is a block diagram illustrating an example of the configuration of the agent server 2 according to the present embodiment. As illustrated in FIG. 3, the agent server 2 includes a speech agent interface (I/F) 20, a dialogue processing section 30, a phoneme storage section 40, a conversation DB generation section 50, a phoneme DB generation section 60, an advertisement insertion processing section 70, an advertisement DB 72, and a feedback acquisition processing section 80.

The speech agent I/F 20 functions as an input/output section of speech data, a speech recognition section, and a speech generation section. For the input/output section, a communication section that transmits and receives with the client terminal 1 through the network 3 is anticipated. The speech agent I/F 20 is capable of receiving the user's uttered speech from the client terminal 1, and converting the speech to text by speech recognition. In addition, the speech agent I/F 20 converts response data (text) of the agent output from the dialogue processing section 30 into speech by using phoneme data corresponding to the agent, and transmits the generated response speech of the agent to the client terminal 1.

The dialogue processing section 30 functions as a computational processing device and control device, and controls overall operation inside the agent server 2 by following various programs. The dialogue processing section 30 is realized by an electronic circuit such as a central processing unit (CPU) or a microprocessor, for example. In addition, the dialogue processing section 30 according to the present embodiment functions as a basic dialogue processing section 31, a character A dialogue processing section 32, a person B dialogue processing section 33, and a person C dialogue processing section 34.

The character A dialogue processing section 32, the person B dialogue processing section 33, and the person C dialogue processing section 34 realize dialogue specialized for each agent. Herein, "character A", "person B", and "person C" are given as an example of the agents, but the present embodiment obviously is not limited thereto, and may also include dialogue processing sections that realize dialogue specialized for each of an even greater number of agents. The basic dialogue processing section 31 realizes general-purpose dialogue that is not specialized for each agent.

Herein, a basic configuration common to the basic dialogue processing section 31, the character A dialogue processing section 32, the person B dialogue processing section 33, and the person C dialogue processing section 34 will be described with reference to FIG. 4.

Figure 4:
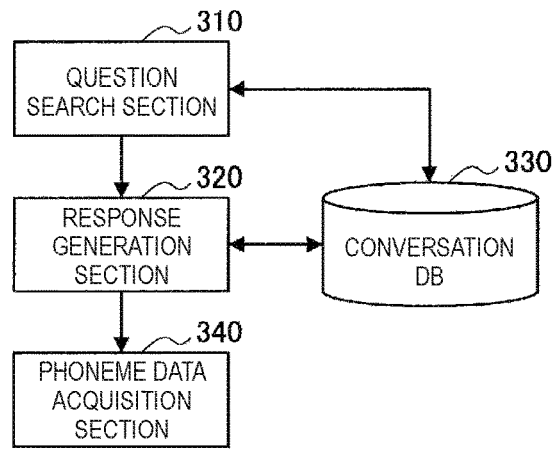
FIG. 4 is a diagram illustrating an exemplary configuration of a dialogue processing section according to the present embodiment.

FIG. 4 is a diagram illustrating an exemplary configuration of a dialogue processing section 300 according to the present embodiment. As illustrated in FIG. 4, the dialogue processing section 300 includes a question search section 310, a response generation section 320, a phoneme data acquisition section 340, and a conversation DB 330. In the conversation DB 330, conversation data containing pairs of question data and response data is saved. In a dialogue processing section specialized for an agent, conversation data specialized for the agent is saved in such a conversation DB 330, whereas in the general-purpose dialogue processing section, general-purpose conversation data (that is, basic conversation data) not specialized for an agent is saved in such a conversation DB 330.

The question search section 310 searches the conversation DB 330 for question data matching a question obtained by recognizing question speech (one example of uttered speech) of the user output from the speech agent I/F 20 and converting the speech to text. The response generation section 320 extracts, from the conversation DB 330, response data saved in association with the question data returned by the search by the question search section 310, and generates response data. The phoneme data acquisition section 340 acquires, from the phoneme storage section 40 of the corresponding agent, phoneme data for converting the response generated by the response generation section 320 to speech. For example, in the case of the character A dialogue processing section 32, phoneme data for playing back the response data in the voice of the character A is acquired from a character A phoneme DB 42. Subsequently, the dialogue processing section 300 outputs the generated response data and the acquired phoneme data to the speech agent I/F 20.

The phoneme storage section 40 stores a phoneme database for generating speech for each agent. The phoneme storage section 40 may be realized by read-only memory (ROM) and random access memory (RAM). In the example illustrated in FIG. 3, a basic phoneme DB 41, a character A phoneme DB 42, a person B phoneme DB 43, and a person C phoneme DB 44 are stored. In each phoneme DB, sub-phonetic segments and their control information, namely a prosody model, for example, are stored as phoneme data.

The conversation DB generation section 50 includes a function of generating the conversation DB 330 of the dialogue processing section 300. For example, the conversation DB generation section 50 collects anticipated question data, and after collecting response data corresponding to each question, saves pairs of question data and response data. Subsequently, when a predetermined amount of conversation data (pairs of question data and response data, for example 100 pairs) is collected, the conversation DB generation section 50 registers the conversation data in the conversation DB 330 as a conversation data set of an agent.

The phoneme DB generation section 60 includes a function of generating the phoneme DB stored in the phoneme storage section 40. For example, the phoneme DB generation section 60 analyzes speech information from reading predetermined text aloud, decomposes the speech information into sub-phonetic segments and their control information, namely a prosody model, and when a predetermined amount or greater of speech information is collected, the phoneme DB generation section 60 executes a process of registering the speech information in the phoneme DB as phoneme data.

The advertisement insertion processing section 70 includes a function of inserting advertisement information into the dialogue of the agent. The advertisement information to insert may be extracted from the advertisement DB 72. In the advertisement DB 72, advertisement information (for example, advertisement content such as text, images, and speech, and information such as the advertiser, the advertisement period, and the advertising target) requested from the providing side (vendor, supplier), such as a corporation, is registered.

The feedback acquisition processing section 80 includes a function for inserting questions for acquiring feedback into the dialogue of the agent, and obtaining feedback from the user.

The above specifically describes a configuration of the agent server 2 according to the present embodiment. Note that the configuration of the agent server 2 according to the present embodiment is not limited to the example illustrated in FIG. 3. For example, each configuration included in the agent server 2 may also be configured as another server on a respective network.

Next, specific operating processes of the communication control system according to the present embodiment will be described with reference to FIGS. 5 to 14.

3. System Operating Processes

<3-1. Conversation Data Registration Process>

Figure 5:
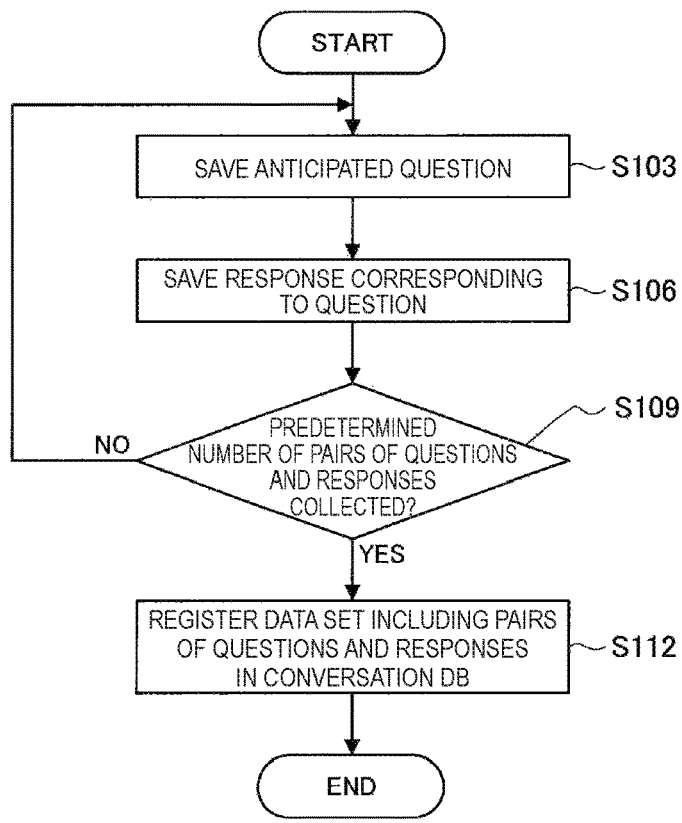
FIG. 5 is a flowchart illustrating a process of generating a conversation DB according to the present embodiment.

FIG. 5 is a flowchart illustrating a process of generating the conversation DB 330 according to the present embodiment. As illustrated in FIG. 5, first, the conversation DB generation section 50 saves an anticipated question (S103).

Next, the conversation DB generation section 50 saves a response corresponding to (paired with) the question (step S106).

Next, the conversation DB generation section 50 determines whether or not a predetermined number of pairs of questions and responses (also designated conversation data) have been collected (step S109).

Subsequently, in the case in which the predetermined number of pairs of questions and conversations have been collected (step S109/Yes), the conversation DB generation section 50 registers a data set including many pairs of questions and responses in the conversation DB 330 (step S112). As an example of pairs of questions and responses, something like the following is anticipated, for example.

Examples of pairs of questions and responses
Pair 1
Question: Good morning.
Response: How are you feeling today?
Pair 2
Question: How's the weather today?
Response: The weather today is 00.
Such pairs may be registered in the conversation DB 330 as conversation data.

<3-2. Phoneme DB Generation Process>

Figure 6:
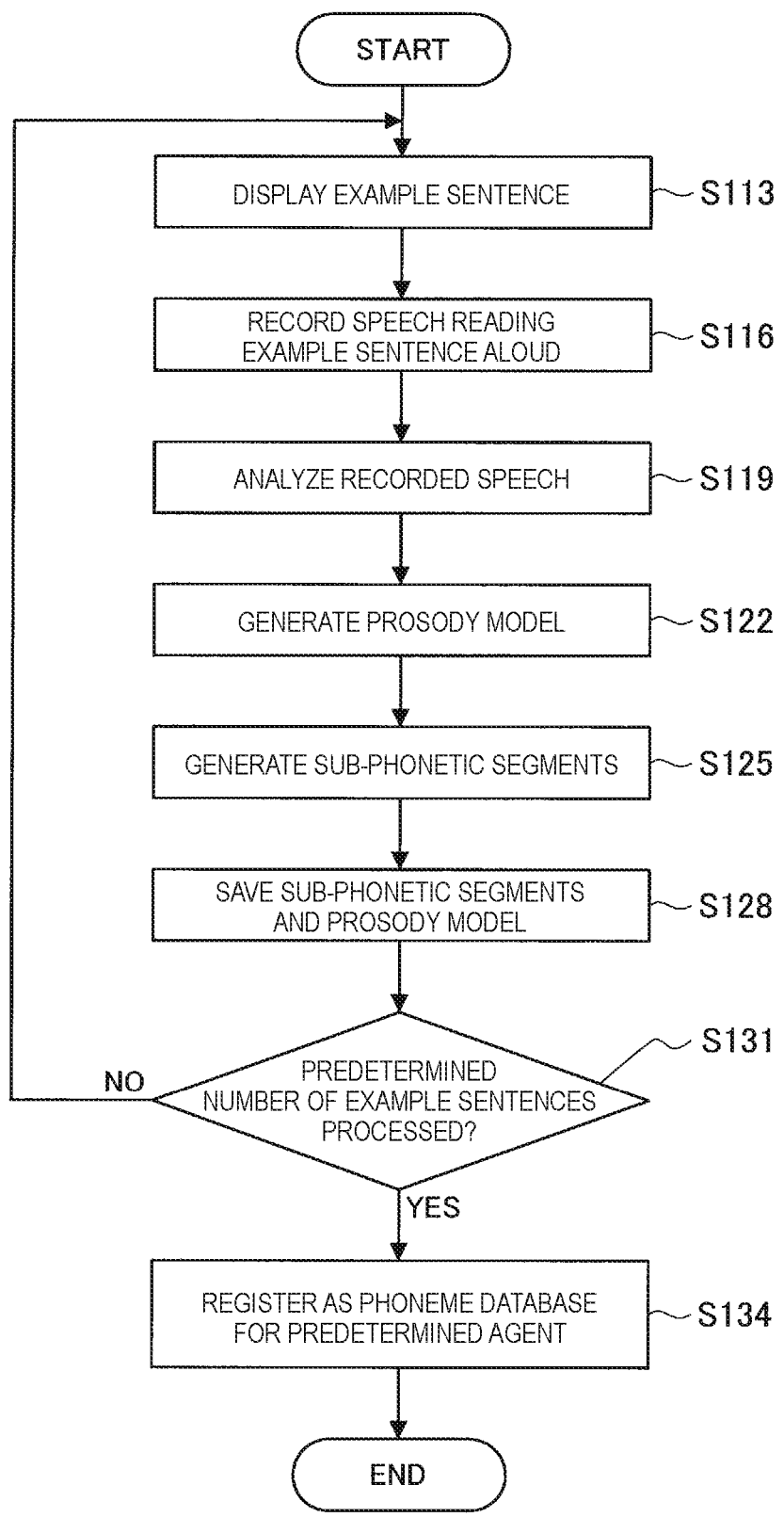
FIG. 6 is a flowchart illustrating a process of generating a phoneme DB according to the present embodiment.

FIG. 6 is a flowchart illustrating a process of generating the phoneme DB according to the present embodiment. As illustrated in FIG. 6, first, the phoneme DB generation section 60 displays an example sentence (step S113). The display of the example sentence displays an example sentence needed for phoneme data generation on the display of an information processing terminal not illustrated, for example.

Next, the phoneme DB generation section 60 records speech of the example sentence being read aloud (step S116), and analyzes the recorded speech (step S119). For example, speech information of reading aloud by a person in charge of the voice of the agent is collected by a microphone of the information processing terminal, and the phoneme DB generation section 60 receives and stores the speech information, and additionally executes speech analysis.

Next, the phoneme DB generation section 60 generates a prosody model on the basis of the speech information (step S122). A prosody model is an extraction of prosody parameters which indicate the prosodic characteristics (such as the pitch of sound, the loudness of sound, and the speed of utterance, for example) of speech, and is different for every person.

Next, the phoneme DB generation section 60 generates sub-phonetic segments (phoneme data) on the basis of the speech information (step S125).

After that, the phoneme DB generation section 60 saves the prosody model and the sub-phonetic segments (step S128).

Next, the phoneme DB generation section 60 determines whether or not a predetermined number of prosody models and sub-phonetic segments have been collected (step S131).

Additionally, in the case in which the predetermined number of prosody models and sub-phonetic segments have been collected (step S131/Yes), the phoneme DB generation section 60 registers the prosody models and the sub-phonetic segments in the phoneme storage section 40 as a phoneme database for a predetermined agent (step S134).

<3-3. Dialogue Control Process>

Figure 7:
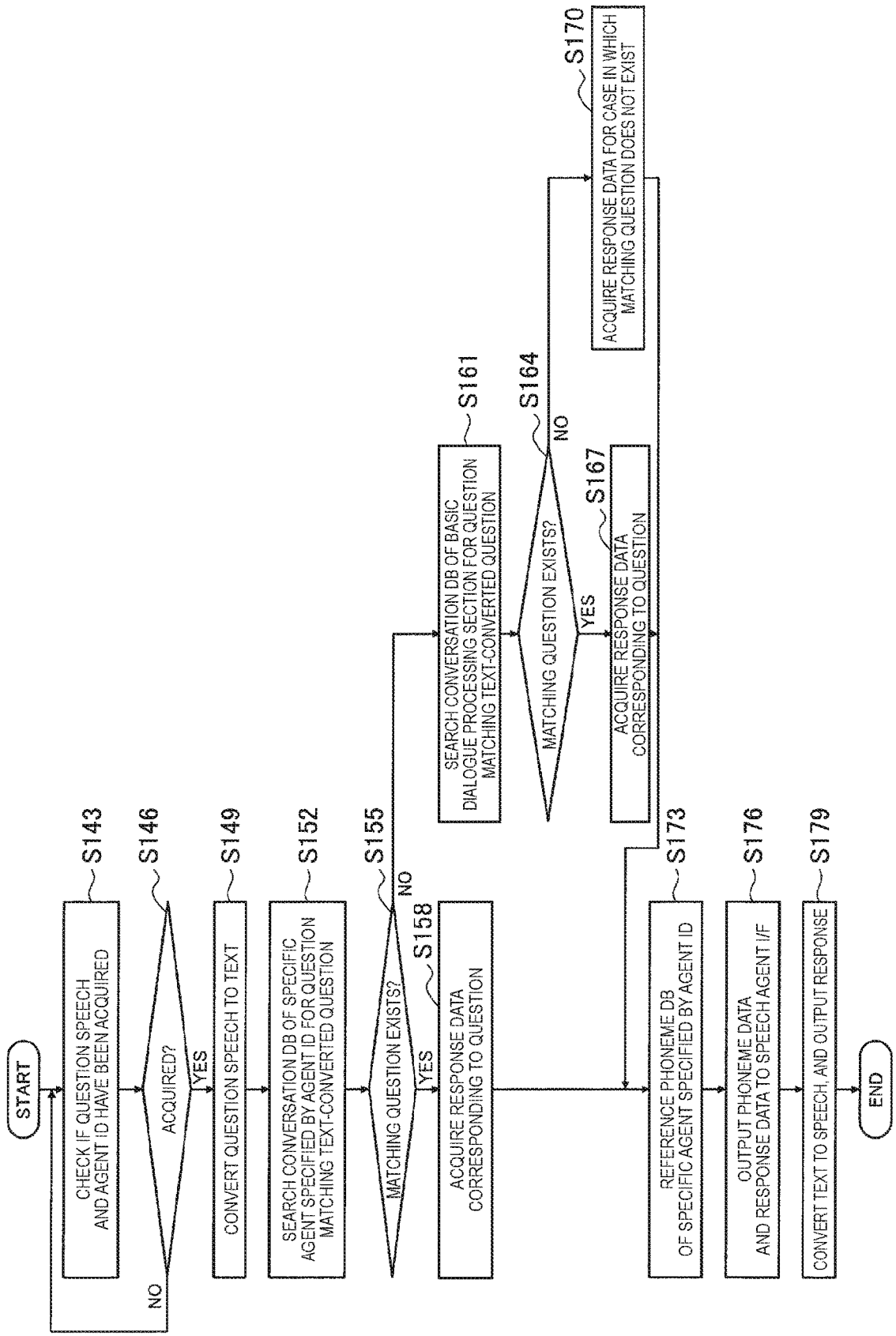
FIG. 7 is a flowchart illustrating a dialogue control process according to the present embodiment.

FIG. 7 is a flowchart illustrating a dialogue control process according to the present embodiment. As illustrated in FIG. 7, first, the speech agent I/F 20 checks whether or not question speech of the user and an agent ID have been acquired (step S143). The agent ID is identification information indicating a specific agent, such as character A, person B, or person C. The user is able to purchase the phoneme data for each agent, and the ID of the purchased agent is saved in the client terminal 1 during the purchase process, for example.

Next, if question speech of the user and an agent ID is acquired (step S146/Yes), the speech agent I/F 20 performs speech recognition and text conversion on the question speech (step S149). The speech agent I/F 20 outputs the text-converted question to the dialogue processing section of the specific agent specified by the agent ID. For example, in the case of "agent ID: character A", the speech agent I/F 20 outputs the text-converted question to the character A dialogue processing section 32.

After that, the dialogue processing section 30 searches the conversation DB of the specific agent specified by the agent ID for a question that matches the text-converted question (step S152).

Next, in the case in which a matching question exists (step S155/Yes), the character A dialogue processing section 32 acquires response data corresponding to (saved as a pair with) the question from the conversation DB of the specific agent (step S158).

On the other hand, in the case in which a matching question does not exist (step S155/No), the conversation DB of the basic dialogue processing section 31 is searched for a question that matches the text-converted question (step S161).

In the case in which a matching question exists (step S161/Yes), the basic dialogue processing section 31 acquires response data corresponding to (saved as a pair with) the question from the basic dialogue processing section 31 (step S167).

On the other hand, in the case in which a matching question does not exist (step S164/No), the basic dialogue processing section 31 acquires response data (for example, a response such as "I don't understand the question") for the case of in which a matching question does not exist (step S170).

After that, the phoneme DB (herein, the character A phoneme DB 42) of the specific agent specified by the agent ID is referenced by the character A dialogue processing section 32, and phoneme data of the character A for generating speech of the response data is acquired (step S173).

Next, the acquired phoneme data and the response data are output to the speech agent I/F 20 (step S176).

Subsequently, the speech agent I/F 20 uses the phoneme data to convert the response data (text) into speech (speech synthesis), and transmits the speech to the client terminal 1 (step S179). In the client terminal 1, the response is played back in the voice of the character A.

<3-4. Conversation DB Update Process>

Next, a process of updating the conversation DB 330 of each dialogue processing section 300 will be described. In the present embodiment, it is possible to make the conversation DB 330 grow through conversation with the user.

Figure 8:
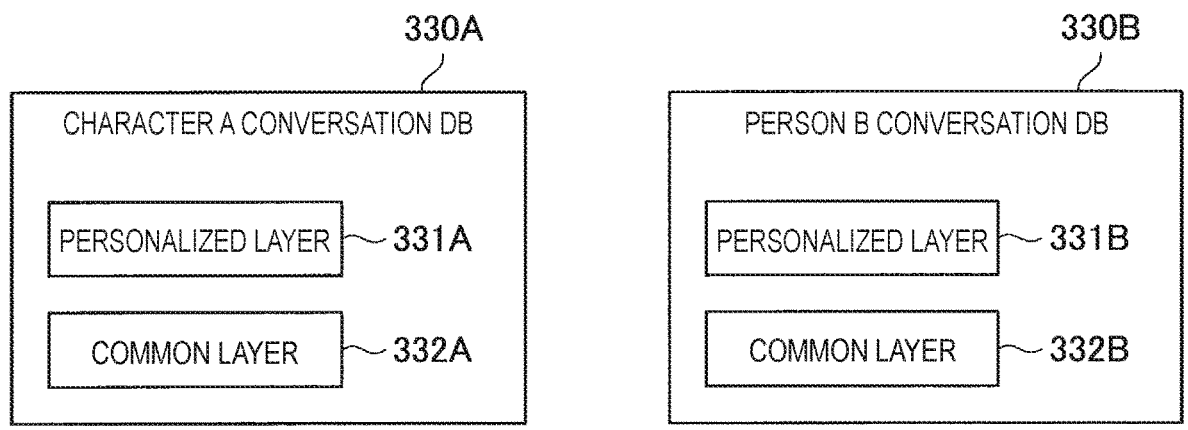
FIG. 8 is a diagram explaining an exemplary data configuration of a conversation DB according to the present embodiment.

First, an exemplary data configuration of the conversation DB 330 will described in further detail with reference to FIG. 8. FIG. 8 is a diagram explaining an exemplary data configuration of the conversation DB 330 according to the present embodiment. As illustrated in FIG. 8, each conversation DB 330 includes two layers, namely a personalized layer 331 and a common layer 332. For example, in the case of the character A conversation DB 330A, conversation data reflecting the personality and characteristics of the character A is stored in the common layer 332A. Meanwhile, in the personalized layer 331A, conversation data that has been customized towards the user through conversation with the user is stored. In other words, although the character A phoneme DB 42 and the character A dialogue processing section 32 are provided (sold) to users as a set, a certain user X and a certain user Y initially engage in dialogue with the same character A (the conversation data stored in the common layer 332A is used), but as the users continue to engage in dialogue, conversation data customized towards each user is accumulated in the personalized layer 331A for each user. With this arrangement, it becomes possible to provide dialogue with the character A that corresponds to what each of the user X and the user Y likes.

Also, even in the case in which the agent "person B" is average persons of different generations without a specific personality like the character A, conversation data may be customized towards the user. In other words, in the case in which "person B" is "a person in his or her 20s", for example, average 20s conversation data is stored in the common layer 332B, and conversation data customized by continued dialogue with the user is stored in the personalized layer 331B for each user. Additionally, the user is also able to select and purchase preferred phoneme data, such as "male", "female", "high-pitched voice", or "low-pitched voice", as the voice of the person B from the person B phoneme DB 43.

Figure 9:
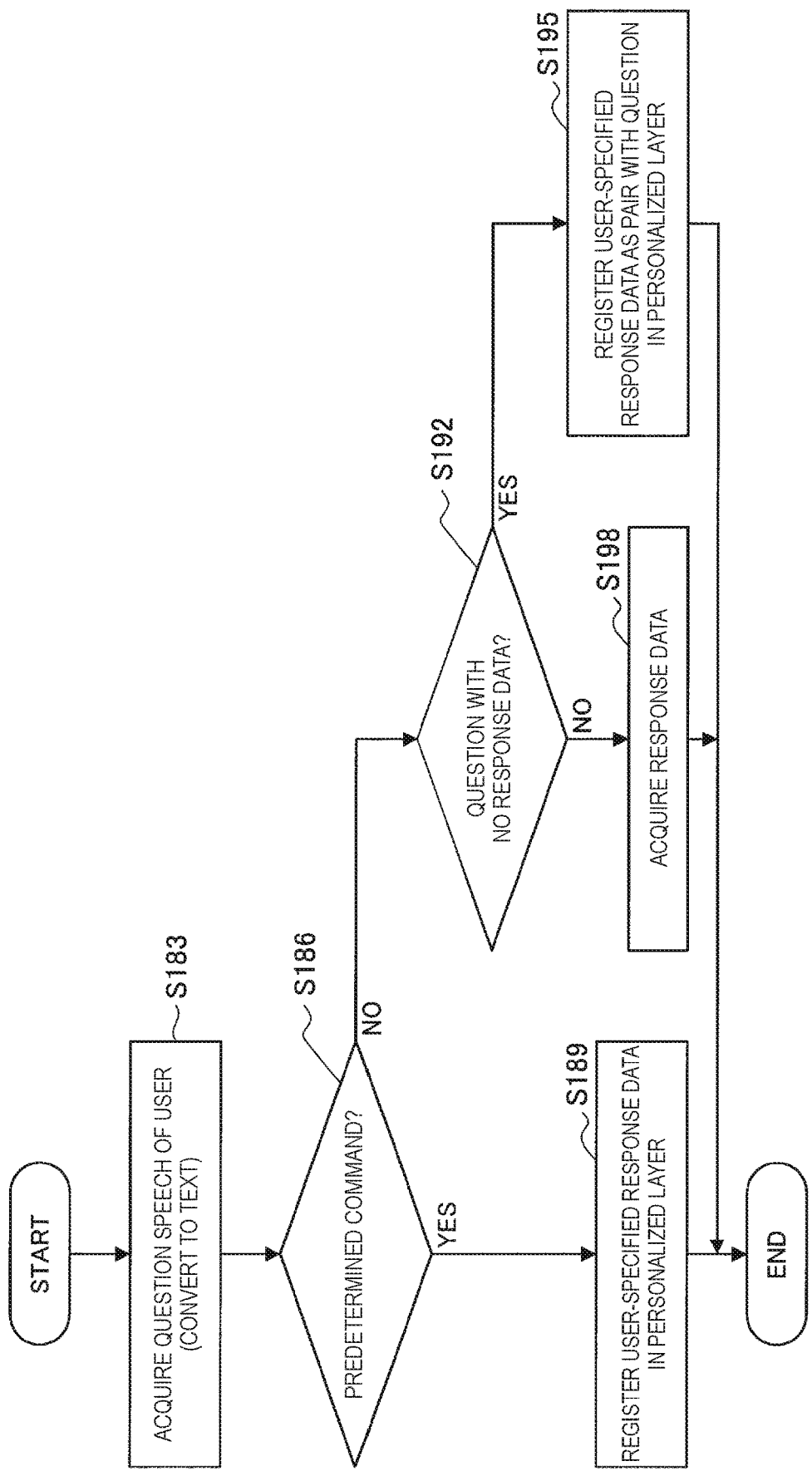
FIG. 9 is a flowchart illustrating a process of updating a conversation DB according to the present embodiment.

A specific process when executing such customization of the conversation DB 330 will be described with reference to FIG. 9. FIG. 9 is a flowchart illustrating a process of updating the conversation DB 330 according to the present embodiment.

As illustrated in FIG. 9, first, the speech agent I/F 20 acquires (receives) question speech of the user from the client terminal 1, and converts the question speech to text by speech recognition (step S183). The text-converted data (question data) is output to the dialogue processing section (herein, the character A dialogue processing section 32, for example) of the specific agent specified by the agent ID.

Next, the character A dialogue processing section 32 determines whether or not the question data is a predetermined command (step S186).

After that, in the case of the predetermined command (step S186/Yes), the character A dialogue processing section 32 registers user-specified response data as a pair with the question data in the personalized layer 331A of the conversation DB 330A (step S189). The predetermined command may be a word such as "NG" or "Settings", for example. For example, by a flow of conversation like the following, the conversation DB of the character A may be customized.

User: "Good morning"
Character A: "Good morning"
User: "NG. Say cheer up and do your best"
Character A: "Cheer up and do your best"

In the above flow of conversation, "NG" is the predetermined command, and after "NG" is uttered by the user, the character A dialogue processing section 32 registers the user-specified response data "Cheer up and do your best" as a pair with the question data "Good morning" in the personalized layer 331A of the conversation DB 330A.

On the other hand, in the case of not the predetermined command (step S186/No), the character A dialogue processing section 32 searches the character A conversation DB 330A for response data stored as a pair with the question data. In the case in which response data stored as a pair with the question data is not stored in the character A conversation DB 330A, that is, in the case in which the user's question is a question with no response (step S192/Yes), the character A dialogue processing section 32 registers a user-specified response in the personalized layer 331A as a pair with the question (step S195). For example, by a flow of conversation like the following, the conversation DB of the character A may be customized.

User: "How's it going?"
Character A: "I don't understand the question" (example response data for the case in which a corresponding response does not exist)
User: "If I ask 'How's it going?', say 'I'm great today as usual'"
Character A: "I'm great today as usual"

In the above flow of conversation, since there is no response data stored as a pair with "How's it going?", example response data for the case in which a corresponding response does not exist, namely "I don't understand the question", is acquired by the character A dialogue processing section 32, output together with the phoneme data of the corresponding character A to the speech agent I/F 20, and played back by the client terminal 1. After that, if the user-specified response "I'm great today as usual" is input, the character A dialogue processing section 32 registers the response as a pair with the question data "How's it going?" in the personalized layer 331A.

Note that in the case of a question having a response (step S192/No), the character A dialogue processing section 32 acquires and outputs the response data together with the phoneme data of the corresponding character A to the speech agent I/F 20, and the response is played back in the voice of the character A by the client terminal 1 (step S198).

Figure 10:
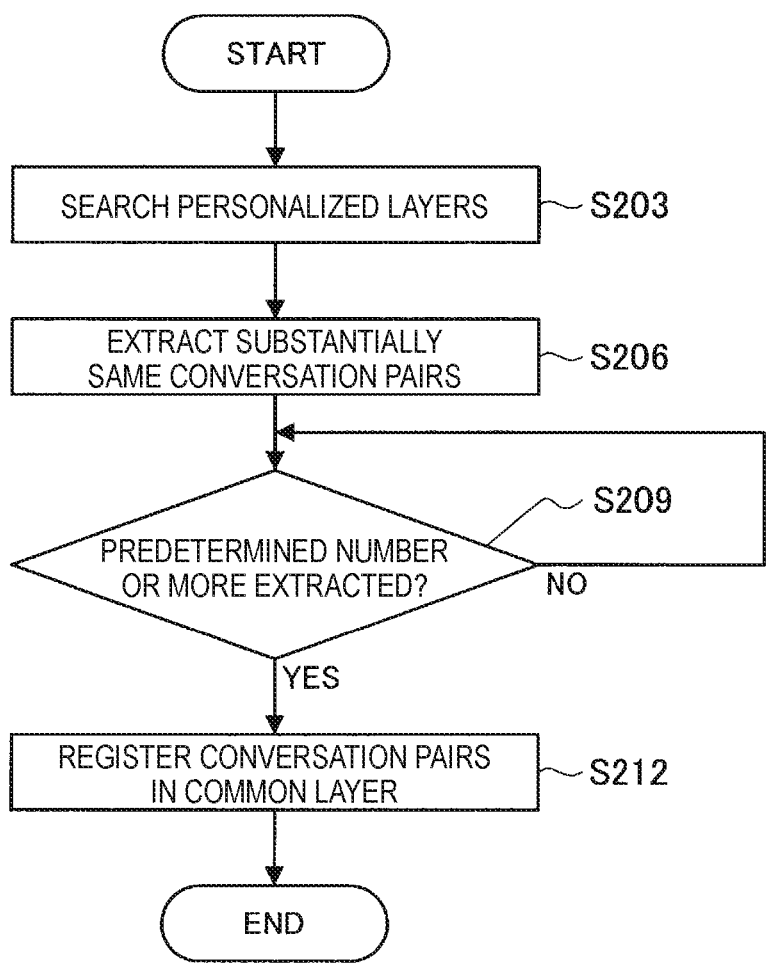
FIG. 10 is a flowchart illustrating a process of moving conversation data from a personalized layer to a common layer according to the present embodiment.

Next, the movement of conversation data from the personalized layer to the common layer will be described with reference to FIG. 10. FIG. 10 is a flowchart illustrating a process of moving conversation data from a personalized layer to a common layer according to the present embodiment. Herein, a process of moving conversation data from the personalized layer 331A to the common layer 332A of the character A dialogue processing section 32 will be described as an example.

As illustrated in FIG. 10, first, the character A dialogue processing section 32 periodically searches the personalized layer 331A for each user (step S203), and extracts conversation pairs (pairs of question data and response data) with substantially the same content (step S206). As conversation pairs with substantially the same content, for example, the pair of the question "How's it going?" and the response "I'm great today as usual!", and the pair of the question "How are you?" and the response "I'm great today as usual!", differ only whether or not the question is in polite words, and may be judged to be conversation pairs with substantially the same content.

Next, in the case in which a predetermined number or more of conversation pairs have been extracted from the personalized layer 331A for each user (step S209/Yes), the character A dialogue processing section 32 registers the conversation pairs in the (in each user's) common layer 332A (step S212).

In this way, by moving conversation pairs having substantially the same content in the personalized layer 331 for each user to the common layer 332, it becomes possible to make the common layer 332 grow (expand the conversation pairs).

Figure 11:
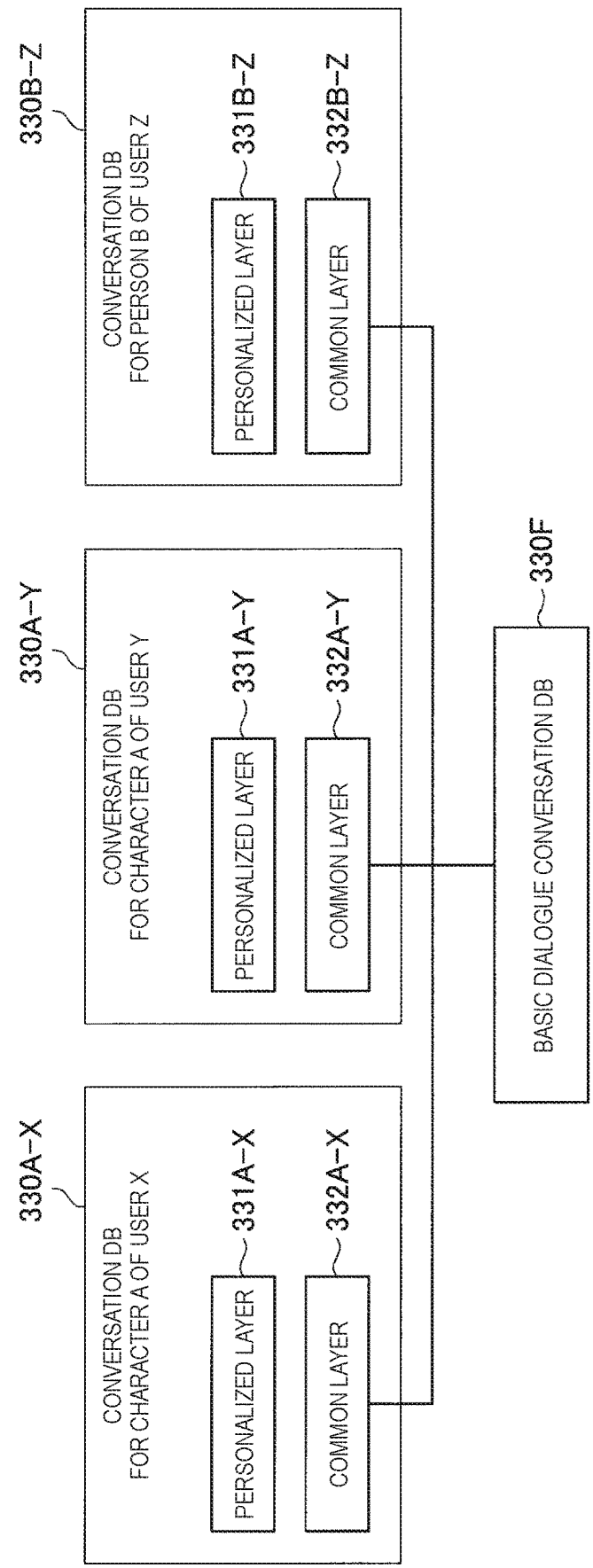
FIG. 11 is a diagram explaining the moving of conversation data to a basic dialogue conversation DB according to the present embodiment.

Additionally, in the present embodiment, it is also possible to cause a conversation DB for basic dialogue to grow by moving conversation data from the conversation DB (specifically, the common layer) of a specific agent to the conversation DB for basic dialogue. FIG. 11 is a diagram explaining the moving of conversation data to the basic dialogue conversation DB 330F according to the present embodiment. For example, in the case in which the user X and the user Y have each selected (purchased) the agent "character A", while a user Z has selected (purchased) the agent "person B", as illustrated in FIG. 11, a conversation DB 330A-X for the character A of user X, a conversation DB 330A-Y for the character A of user Y, and a conversation DB 330B-Z for the person B of user Z may exist in the dialogue processing section 30. In this case, in each personalized layer 331A-X, 331A-Y, and 331B-Z, individual (customized) conversation pairs are registered according to the dialogue with each of the user X, the user Y, and the user Z (see FIG. 9). Next, if there are a predetermined number of conversation pairs which are substantially the same in the personalized layers 331A-X and 331A-Y of the same agent, the conversation pairs are registered in each of the common layers 332A-X and 332A-Y for each user (see FIG. 10).

Figure 12:
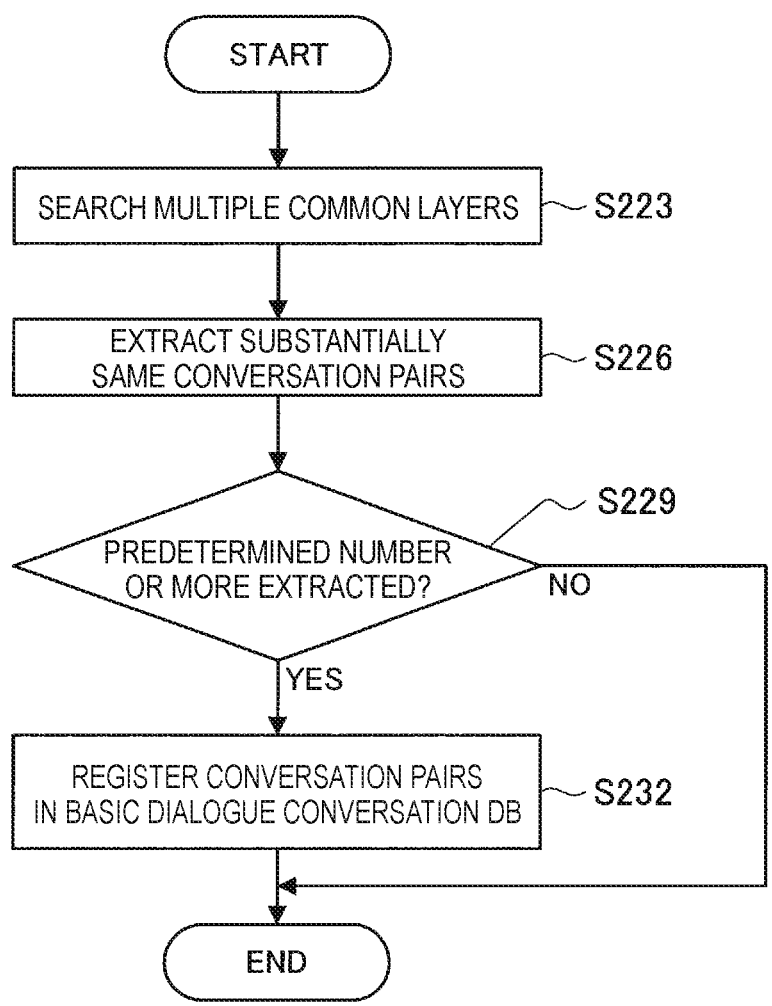
FIG. 12 is a flowchart illustrating a process of moving conversation data to the basic dialogue DB according to the present embodiment.

Additionally, in the case in which a predetermined number or more of conversation pairs which are substantially the same is extracted from the common layers 332A-X, 332A-Y, and 332B-Z of multiple agents (which may also include different agents), the dialogue processing section 30 moves the conversation pairs to the higher-layer basic dialogue conversation DB 330F. The basic dialogue conversation DB 330F is a conversation DB included in the basic dialogue processing section 31. With this arrangement, it becomes possible to make the basic dialogue conversation DB 330F grow (expand the conversation pairs). Such a data movement process will be described specifically with reference to FIG. 12. FIG. 12 is a flowchart illustrating a process of moving conversation data to the basic dialogue conversation DB 330F according to the present embodiment.

As illustrated in FIG. 12, first, the dialogue processing section 30 periodically searches the common layers 332 of multiple conversation DBs 330 (step S223), and extracts conversation pairs which are substantially the same (step S226).

Next, in the case in which a predetermined number or more conversation pairs which are substantially the same have been extracted from the multiple common layers 332 (step S229/Yes), the dialogue processing section 30 registers the conversation pairs in the basic dialogue conversation DB 330F (step S232).

In this way, by moving conversation pairs with substantially the same content in the common layer 332 of the conversation DB 330 for multiple agents to the basic dialogue conversation DB 330F, it becomes possible to make the basic dialogue conversation DB 330F grow (expand the conversation pairs).

<3-5. Advertisement Output Process>

Next, the process of inserting advertisement information by the advertisement insertion processing section 70 will be described with reference to FIGS. 13 and 14. In the present embodiment, by the advertisement insertion processing section 70, it is possible to insert advertisement information stored in the advertisement DB 72 into an utterance of an agent. Advertisement information may be registered in the advertisement DB 72 in advance. FIG. 13 is a diagram illustrating an example of advertisement information registered in the advertisement DB 72 according to the present embodiment.

As illustrated in FIG. 13, advertisement information 621 includes an agent ID, a question, advertisement content, a condition, and a probability. The agent ID specifies the agent to utter the advertisement content, the question specifies the question of the user that acts as a trigger for inserting the advertisement content, and the advertisement content is the advertisement sentence to insert into the dialogue of the agent. Also, the condition is a condition on inserting the advertisement content, and the probability indicates the probability of inserting the advertisement content. For example, in the example illustrated on the first row of FIG. 13, in the case in which the word "chocolate" is included in a question from a user who is 30 years old or less in a dialogue with the agent "character A", advertisement content stating "The new chocolate on sale from BB Co. contains a lot of milk and is delicious" is inserted into the response. Also, since the user might feel annoyed if the advertisement content is inserted every time the triggering question is uttered, in the present embodiment, the probability of inserting the advertisement may also be set. Such a probability may be decided according to the advertisement fee. For example, as the advertisement fee becomes higher, a higher probability is set.

Such a process of inserting advertisement content will be described specifically with reference to FIG. 14. FIG. 14 is a flowchart illustrating the process of inserting advertisement content according to the present embodiment.

Figure 14:
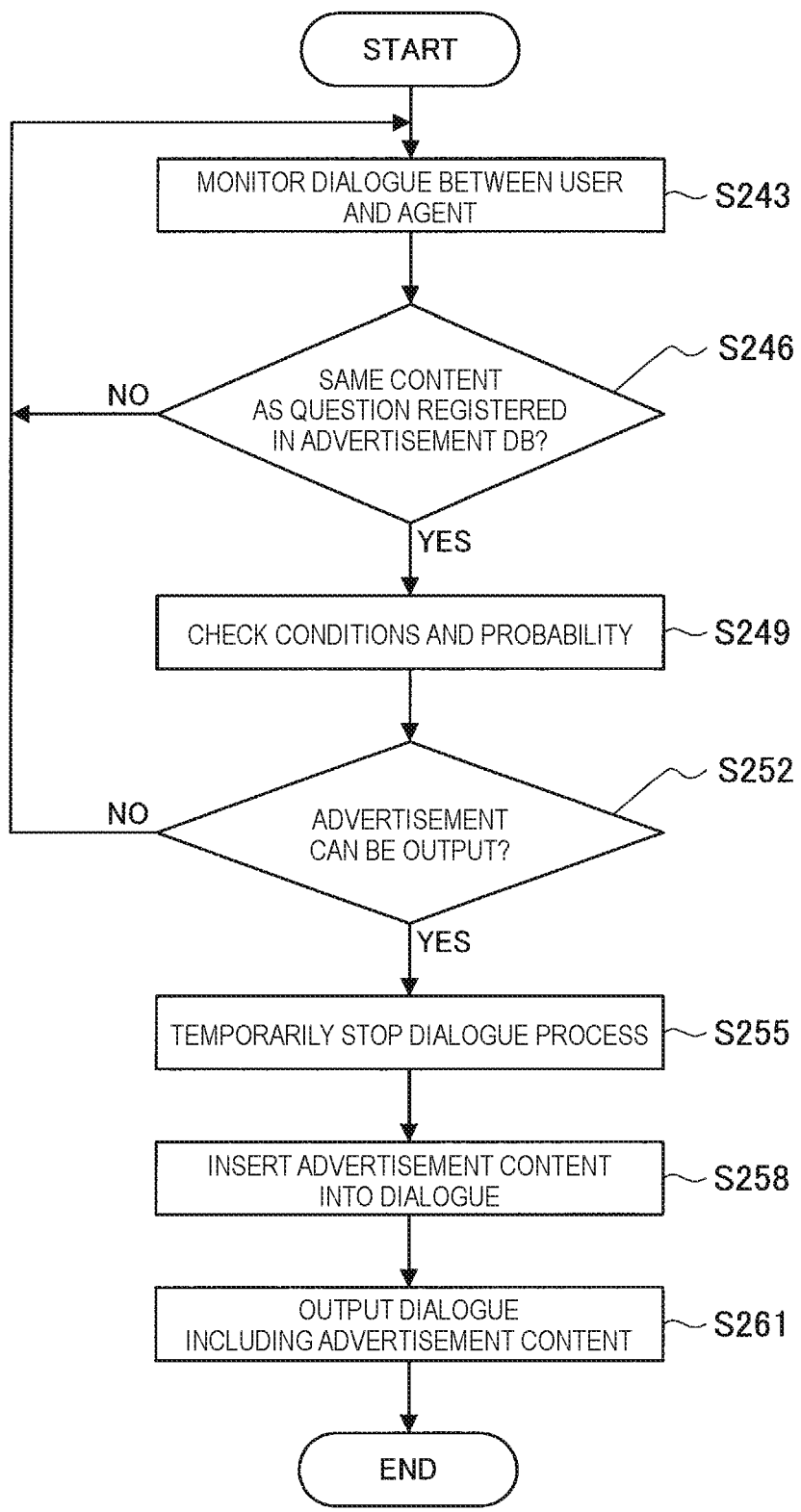
FIG. 14 is a flowchart illustrating a process of inserting advertisement content according to the present embodiment.

As illustrated in FIG. 14, first, the advertisement insertion processing section 70 monitors the dialogue (specifically, the dialogue process by the dialogue processing section 30) between the user and the agent (step S243).

Next, the advertisement insertion processing section 70 determines whether or not a question with the same content as a question registered in the advertisement DB 72 has appeared in the dialogue between the user and the agent (step S246).

After that, in the case in which a question with the same content has appeared (step S246/Yes), the advertisement insertion processing section 70 checks the condition and probability of advertisement insertion associated with the corresponding question (step S249).

Subsequently, on the basis of the condition and the probability, the advertisement insertion processing section 70 determines whether or not the advertisement can be output (step S252).

Next, in the case in which the advertisement can be output (step S252/Yes), the advertisement insertion processing section 70 temporarily stops the dialogue process by the dialogue processing section 30 (step S255), and inserts the advertisement content into the dialogue (step S258). Specifically, the advertisement content is inserted into a response of the agent with respect to the question of the user, for example.

Additionally, dialogue (conversation data) including the advertisement content is output from the dialogue processing section 30 to the speech agent I/F 20, transmitted from the speech agent I/F 20 to the client terminal 1, and played back in the voice of the agent (step S261). Specifically, advertisement content may be presented to the user as an utterance of the character A through a conversation like the following, for example.

User: "Good morning"

Character A: "Good morning! How are you feeling today?"

User: "I'm great. I want to eat something delicious"

Character A: "They say the barbecue at CC is delicious"

In the above conversation, first, with respect to the user question "Good morning", the corresponding response found in the conversation DB of the character A, namely "Good morning! How are you feeling today?" is output as speech. After that, since the user question "I'm great. I want to eat something delicious" includes the question "I want to eat something delicious" that acts as a trigger for advertisement insertion (refer to the second row of FIG. 13), the advertisement insertion processing section 70 executes the advertisement insertion process, and a response stating the advertisement content "They say the barbecue at CC is delicious" is output in the voice of the character A.

The above describes a conversation data registration process, a phoneme DB generation process, a dialogue control process, a conversation DB update process, and an advertisement insertion process as basic operating processes of the communication control system according to the present embodiment.

Note that the conversation data registration process according to the present embodiment is not limited to the example described above. The conversation DB generation section 50 according to the present embodiment is able to collect utterance data for every agent character from a large number of general users, and audit the collected utterance data. In addition, once a fixed amount of audited utterance data is accumulated, the data may be output to the dialogue processing section 30 as a data set, and stored in the conversation DB 330 of the dialogue processing section 300 of the corresponding agent character. Hereinafter, such a conversation DB generation section 50 that collects and audits utterance data will be described specifically with reference to FIGS. 15 to 30.

4. Utterance Data Management

<4-1. Configuration>
(4-1-1. Configuration of Conversation DB Generation Section)

Figures 15, 16:
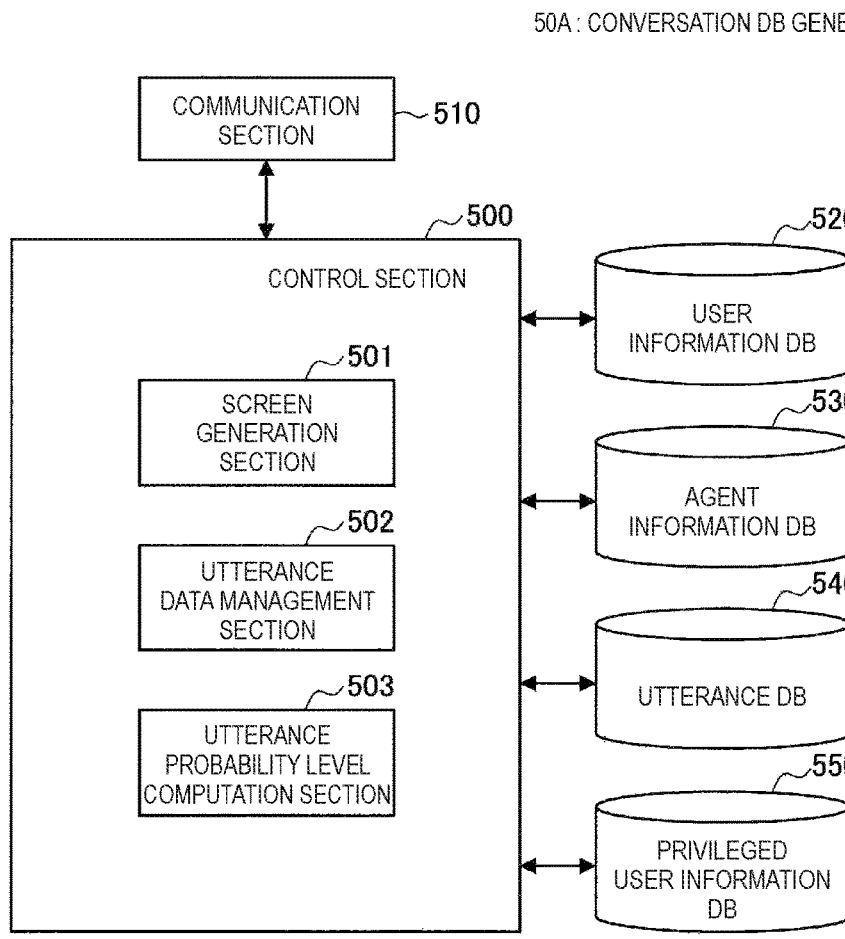
FIG. 15 is a diagram illustrating an exemplary configuration of a conversation DB generation section according to the present embodiment.
FIG. 16 is a diagram illustrating an example of user information stored in a user information DB according to the present embodiment.

FIG. 15 is a diagram illustrating an exemplary configuration of a conversation DB generation section 50A according to the present embodiment. As illustrated in FIG. 15, the conversation DB generation section 50A includes a control section 500, a communication section 510, a user information DB 520, an agent information DB 530, an utterance DB 540, and a privileged user information DB 550.

The communication section 510 includes a function of connecting to an external apparatus in a wired or wireless manner, and transmitting or receiving data. For example, the communication section 510 connects to the client terminal 1 of a general user or a privileged user (a user with special rights) and transmits or receives data over a network.

The control section 500 functions as a computational processing apparatus and a control apparatus, and controls overall operation inside the conversation DB generation section 50A by following various programs. The control section 500 is realized by an electronic circuit such as a CPU or a microprocessor, for example. In addition, the control section 500 according to the present embodiment functions as a screen generation section 501, an utterance data management section 502, and an utterance probability level computation section 503.

The screen generation section 501 includes a function of generating a registration screen for registering utterance data by general users, and an utterance data auditing screen. The generated registration screen and auditing screen are transmitted to the client terminal 1 of a user via the communication section 510, and displayed. The agent according to the present embodiment is managed by a specific copyright holder or owner, for example, and in addition, is an entity such as what is called an idol, for which passionate fans exists or for which a fan club is formed. Each user is capable of inputting and registering, from a predetermined registration screen, desired language (utterances) they would like the agent to say. For example, since passionate fans have a deep understanding of the characterization of the agent, even if the copyright holder or owner does not create everything, a large number of words and phrases that the character would plausibly say can be registered by the fans, and enrichment of the utterance DB 540 can be expected. Note that specific examples of the registration screen and the auditing screen according to the present embodiment will be described later with reference to FIGS. 22, 26, 27, and 29.

The utterance data management section 502 performs management operations such as registering, modifying, and deleting utterance data stored in the utterance DB 540. For example, the utterance data management section 502 writes utterance data input by a user from the registration screen to the utterance DB 540, and in addition, causes modifications of utterance data input from the auditing screen to be reflected in the utterance DB 540.

The utterance probability level computation section 503 computes a degree (hereinafter called the "utterance probability level") to which a corresponding agent character would plausibly utter (say) the utterance data stored in the utterance DB 540. The utterance probability level is computed as a numerical value from 0.0 to 1.0, for example. The details of the computation method will be described later.

The user information DB 520 stores various user-related information. FIG. 16 is a diagram illustrating an example of user information stored in the user information DB 520 according to the present embodiment. As illustrated in FIG. 16, the user information includes a user ID and password for login, as well as a flag indicating whether or not the user is a member of a fan club for the agent, for example.

The agent information DB 530 stores various agent-related information. FIG. 17 is a diagram illustrating an example of agent information stored in the agent information DB 530 according to the present embodiment. As illustrated in FIG. 17, the agent information includes an agent ID and an agent image, for example. Also, additional information such as a promotional video (PV) and agent speech may also be included as well.

The utterance DB 540 stores utterance data of each agent. FIG. 18 illustrates an example of utterance data stored in the utterance DB 540 according to the present embodiment. As illustrated in FIG. 18, the utterance data includes the information of an agent ID, an utterance, a trigger, an utterance probability level, and an utterable flag. The agent ID indicates the agent to which the utterance data belongs. In the utterance DB 540, utterance data is stored in association with each of multiple agents. In FIG. 18, utterance data associated with "character A" is illustrated as an example. Also, the trigger is set for a timing at which the agent utters the utterance data. For example, since the utterance "good morning" illustrated on the first row of the utterance data in FIG. 18 has the trigger "user-set wakeup time", when the wakeup time set by the user is reached, the utterance "good morning" is output in the voice of the character A. Also, for example, the utterance "cheer up" with the trigger "emotion: discouraged" is output in the voice of the character A when the emotion of the user becomes a "discouraged" state. The emotion of the user is inferred by the dialogue processing section 30 that generates utterances, on the basis of user behavior, biological information, posted content on a social networking service (SNS), and the like.

When the utterance data accumulated in the utterance DB 540 reaches a predetermined amount, the utterance data is registered in the conversation DB 330 of the dialogue processing section 300 as a data set of utterances of the corresponding agent by the control section 500.

The "utterance probability level" is the degree to which the character of the agent would plausibly say an utterance, and is computed on the basis of each utterance probability level input by general users or privileged users, for example. In the example illustrated in FIG. 18, the utterance probability level is set as a numerical value from 0.0 to 1.0. The dialogue processing section 30 controls the output of the utterance data while taking the utterance probability level into account.

The "utterable flag" is a setting to allow or deny an utterance, and is input by a privileged user. In the case in which the utterable flag is "false", the utterance is made unavailable, regardless of the utterance probability level. Note that although the present embodiment describes the input of the "utterable flag" indicating that an utterance is allowed, the present embodiment is not limited thereto, and may also be configured such that an "utterance prohibited flag" indicating that an utterance is prohibited is input. The "utterable flag" and the "utterance prohibited flag" are both examples of an utterance availability flag.

The privileged user information DB 550 stores various information related to users who have special rights. The users who have special rights (privileged users) are users who can set the "utterable flag" described above, and are imagined to be the agent copyright holder, owner, a related party, or the like, for example. FIG. 19 illustrates an example of privileged user information stored in the privileged user information DB 550 according to the present embodiment. As illustrated in FIG. 19, the privileged user information includes the information of an agent ID, as well as a password and a privileged user ID for login, for example. The agent ID indicates the agent to which the privileged user belongs, while the password and the privileged user ID are used when logging in to an auditing screen for privileged users.

(4-1-2. Configuration of Dialogue Processing Section)

Figure 20:
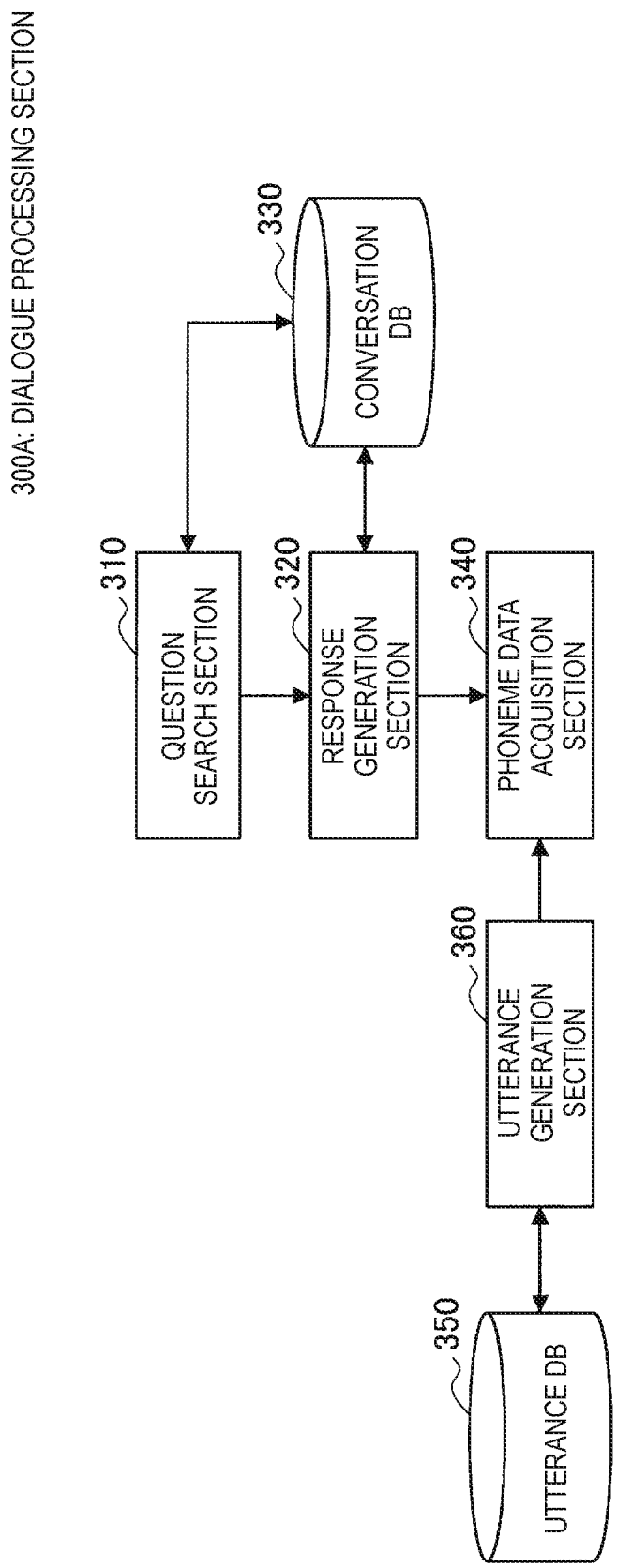
FIG. 20 is a diagram illustrating an exemplary configuration of a dialogue processing section according to the present embodiment.

FIG. 20 is a diagram illustrating an exemplary configuration of the dialogue processing section 300A according to the present embodiment. As illustrated in FIG. 20, the dialogue processing section 300A includes a question search section 310, a response generation section 320, a conversation DB 330, a phoneme data acquisition section 340, an utterance DB 350, and an utterance generation section 360.

Since the question search section 310, the response generation section 320, the conversation DB 330, and the phoneme data acquisition section 340 are similar to the configurations with the same signs described with reference to FIG. 4, a description is omitted here.

The utterance generation section 360 searches the utterance DB 350 in response to a predetermined trigger. In the utterance DB 350, a data set of utterances accumulated in the utterance DB 540 of the conversation DB generation section 50A is saved. The utterance data saved in the utterance DB 350 may be updated periodically by the conversation DB generation section 50A.

For example, when a wakeup time set by the user is reached, the utterance generation section 360 searches the utterance DB 350 for utterances whose trigger is the "user-set wakeup time", and treats these utterances as the utterance data. At this time, the utterance generation section 360 selects a single piece of utterance data by taking into account the utterance probability level of the utterance data in addition to the trigger. Also, in the case in which the "utterable flag" of the utterance data is "False", the utterance generation section 360 is configured not to select the utterance as the utterance data. Such a selection of utterance data will be described in detail with reference to FIG. 30.

The utterance data generated by the utterance generation section 360 is output to the phoneme data acquisition section 340, the phonemes of a specific agent are acquired by the phoneme data acquisition section 340, and the utterance data as well as the phoneme data are output to the speech agent I/F 20. Subsequently, the utterance data is converted to speech in the voice of the specific agent by the speech agent I/F 20, and output as an utterance of the specific agent from the client terminal 1 of the user.

The above describes the configuration of the dialogue processing section 300A according to the present embodiment.

<4-2. Operating Processes>

Next, each operating process according to the present embodiment will be described with reference to FIGS. 21 to 30.

(4-2-1. Collection Process)

Figure 21:
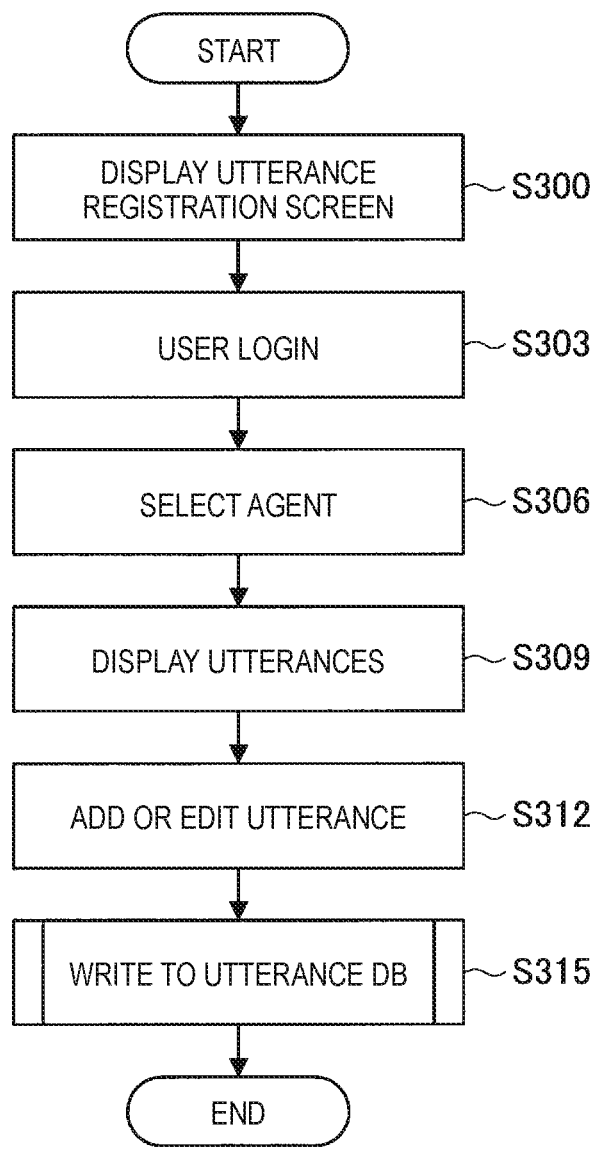
FIG. 21 is a flowchart illustrating an utterance data collection process according to the present embodiment.

FIG. 21 is a flowchart illustrating an utterance data collection process according to the present embodiment. As illustrated in FIG. 21, first, the conversation DB generation section 50A of the agent server 2 displays the utterance registration screen generated by the screen generation section 501 on the client terminal 1 possessed by the user (step S300). Specifically, the conversation DB generation section 50A transmits the utterance registration screen from the communication section 510 to the client terminal 1, and causes the display section of the client terminal 1 to display the utterance registration screen.

Figure 22:
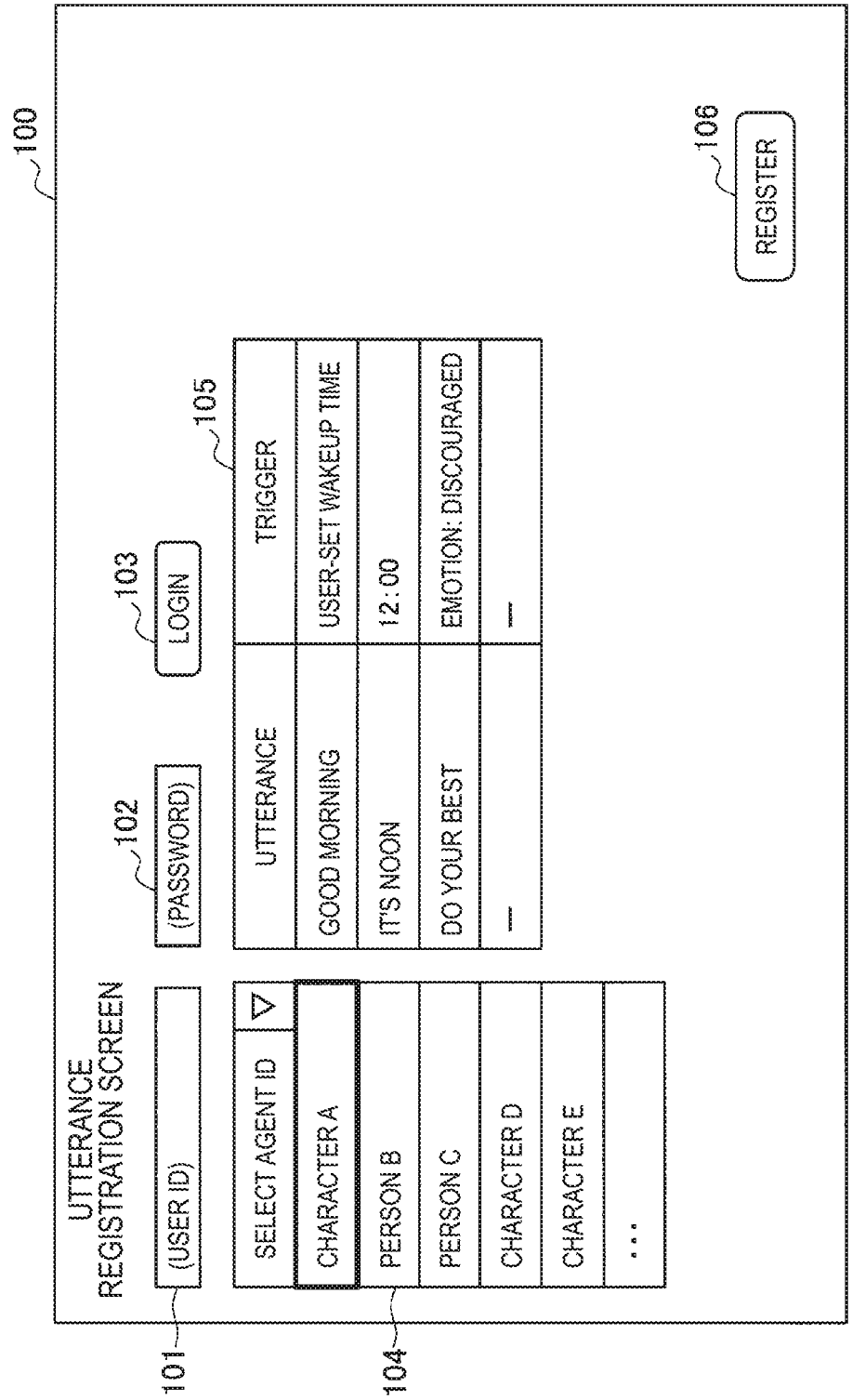
FIG. 22 is a diagram illustrating an example of an utterance registration screen according to the present embodiment.

Next, a user login process is executed on the basis of a user ID and the like input from the utterance registration screen (step S303). Herein, FIG. 22 illustrates an example of the utterance registration screen according to the present embodiment. As illustrated in FIG. 22, on a registration screen 100, a user ID input field 101, a password input field 102, a Login button 103, an agent ID selection field 104, and an utterance input field 105 are displayed. The user inputs a user ID into the user ID input field 101 of the registration screen 100, additionally inputs a password into the password input field 102, and selects the Login button 103. With this arrangement, the input user ID and password are transmitted from the client terminal 1 to the conversation DB generation section 50A of the agent server 2, and a login process is executed by the control section 500. Specifically, user IDs and passwords preregistered in the user information DB 520 are referenced, and an authentication process is executed.

Next, a selection of an agent by the user is received (step S306). For example, the user operates the agent ID selection field 104 of the registration screen 100 to select the agent for which the user desires to register an utterance from among multiple agents such as "character A", "person B", "person C", and "character D" displayed in a pull-down list. The selected agent ID is transmitted from the client terminal 1 to the agent server 2 as request information that requests the utterance data of the specific agent.

Next, by the control section 500, the conversation DB generation section 50A of the agent server 2 extracts registered utterances of the agent selected by the user from the utterance DB 540, and displays the extracted utterances in the utterance input field 105 of the registration screen 100 (step S309). In the case in which registered user information (for example, a user ID) is associated with the utterance data, the control section 500 may also extract the utterance data that the user has registered until now from among the utterance data of the specified agent ID, and display the extracted utterance data on the registration screen 100 of the client terminal. Also, herein, the agent ID is transmitted from the client terminal 1 to the agent server 2 as an example of request information, but the present embodiment is not limited thereto. For example, the user may specify situation information (a trigger), which may be transmitted to the agent server 2 as the request information. In the case in which situation information (such as a time, place, user condition, or user emotion) is specified, the control section 500 extracts utterance data triggered by the specified situation from the utterance DB 540, and replies to the client terminal 1. Also, at least one or more of the agent ID, the user ID, and the situation information may be specified by the user, transmitted to the agent server 2 as the request information, and relevant utterance data may be included in a reply by the control section 500.

Next, when an utterance is added or edited by the user (step S312), the utterance data management section 502 writes the utterance data added or edited by the user to the utterance DB 540 (step S315). Specifically, the user edits an already-registered utterance being displayed in the utterance input field 105 of the registration screen 100, or inputs a new utterance. In the utterance input field 105, utterance text may be edited or input, and a trigger indicating the utterance timing may be edited or input. When editing or input is finished, the user selects a Register button 106 displayed on the registration screen 100. With this arrangement, the edited or input content is transmitted to the conversation DB generation section 50A of the agent server 2, and stored in the utterance DB 540 by the control section 500. The process of writing to the utterance DB 540 will be described later with reference to FIG. 24.

Figure 23:
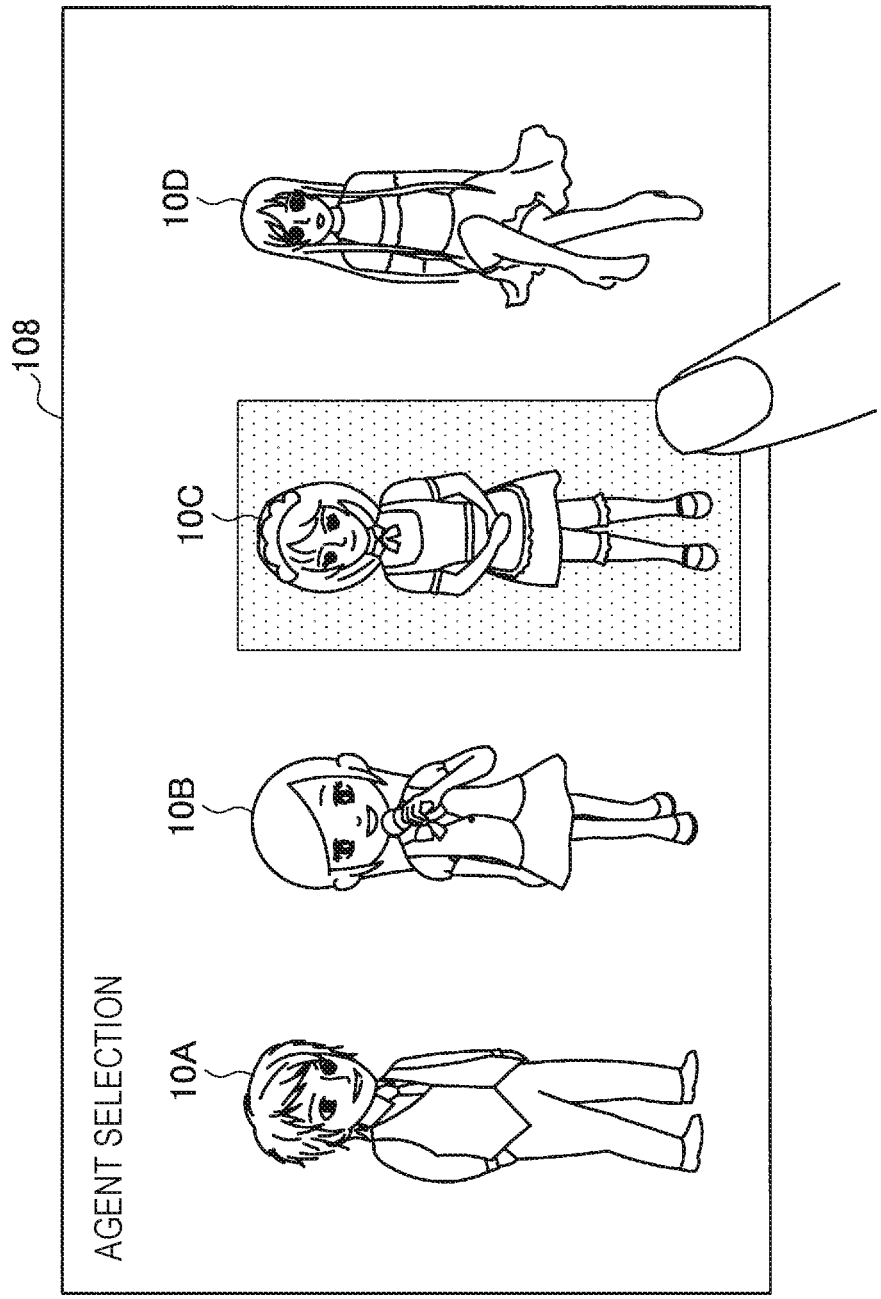
FIG. 23 is a diagram illustrating an example of an agent selection screen according to the present embodiment.

In this way, utterances of each agent are collected from each user. Note that the selection of an agent is not limited to a selection from a pull-down list as described above, and it is also possible to select an agent while looking at images of agents. FIG. 23 illustrates an example of an agent selection screen according to the present embodiment. In the illustrated example, on a screen 108, multiple agent characters 10A to 10D are displayed. From among each of the agent characters 10A to 10D displayed on the client terminal 1, the user taps or the like to select an agent character for which the user desires to edit or input an utterance.

Figure 24:
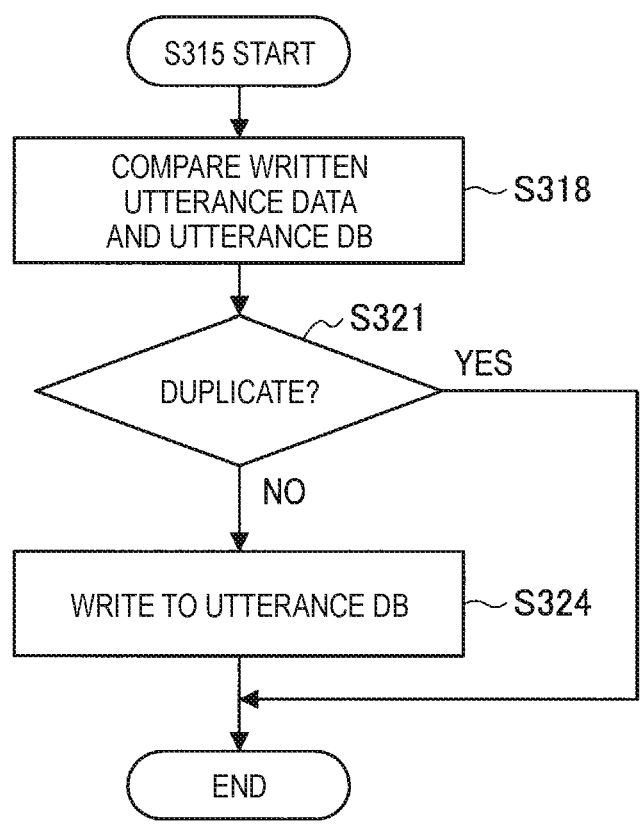
FIG. 24 is a flowchart illustrating a general user auditing process according to the present embodiment.

Next, the process of writing to the utterance DB 540 in the above step S315 will be described with reference to FIG. 24. FIG. 24 is a flowchart illustrating the process of writing to the utterance DB 540 according to the present embodiment.

As illustrated in FIG. 24, first, the utterance data management section 502 of the conversation DB generation section 50A compares the utterance data to be written and the utterance DB 540 (step S318), and determines whether or not a duplicate exists (step S321). Specifically, the utterance data management section 502 references the already-registered utterance data of the corresponding agent stored in the utterance DB 540, and determines whether or not a duplicate of the utterance data to be written exists.

Next, in the case in which duplicate utterance data does not exist (step S321/No), the utterance data management section 502 executes a process of writing the utterance data to the utterance DB 540 (step S324). On the other hand, in the case in which duplicate utterance data exists (step S321/Yes), the process of writing to the utterance DB 540 is not executed.

The above describes the writing process specifically. Note that herein, as an example, a duplicate check is executed when registering utterance data in the utterance DB 540, but the present embodiment is not limited thereto. For example, utterance data may also be registered (in a user utterance DB) for each user (each registered user), and after a certain amount is accumulated in the user utterance DB, a duplicate check may be executed and the utterance data may be merged with the utterance DB 540.

(4-2-2. Auditing Process)

Next, the process of auditing collected utterance data will be described with reference to FIGS. 25 to 29. User who audit utterance data may also be ranked in various ways. For example, users may be ranked according to whether or not the user is a passionate fan, such as being a member of the fan club for the corresponding agent, and also according to whether or not the user has special rights (also referred to as a privileged user), such as the copyright holder, owner, or the like of the corresponding agent. With this arrangement, when the utterance probability level is changed or updated by a fan club member, for example, it is possible to weight the computation more than the case of a non-member. Furthermore, it is also possible to enable a privileged user to set the utterable flag. Hereinafter, auditing by general users including fan club members and auditing by privileged users will be described in succession.

(Auditing by General Users)

Figure 25:
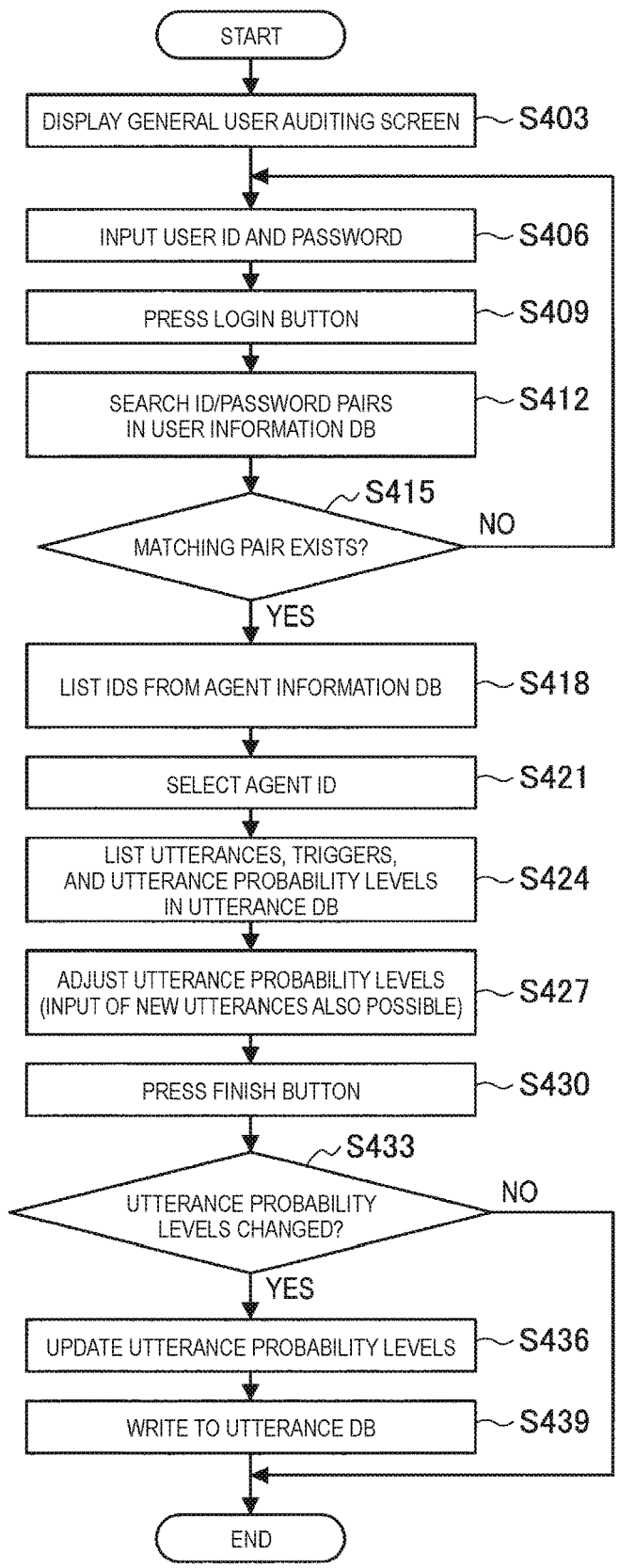
FIG. 25 is a flowchart illustrating a general user auditing process according to the present embodiment.

FIG. 25 is a flowchart illustrating a general user auditing process according to the present embodiment. As illustrated in FIG. 25, first, the conversation DB generation section 50A of the agent server 2 displays a general user auditing screen generated by the screen generation section 501 on the client terminal 1 (step S403).

Next, when the user inputs a user ID and password from the general user auditing screen (step S406) and presses a Login button (step S409), the conversation DB generation section 50A executes a user login process by the control section 500 on the basis of the input information (steps S412 to S415).

Specifically, the control section 500 searches pairs of IDs and passwords registered in the user information DB 520 (step S412), and authenticates the user by determining whether or not a match with the pair of the ID and password input by the user exists (step S415). Herein, FIG. 26 illustrates an example of the general user auditing screen according to the present embodiment. As illustrated in FIG. 26, on an auditing screen 110, a general user ID input field 111, a password input field 112, and a Login button 113 are displayed. The user inputs a user ID into the user ID input field 111 of the auditing screen 110, additionally inputs a password into the password input field 112, and selects the Login button 113. With this arrangement, the input user ID and password are transmitted from the client terminal 1 to the conversation DB generation section 50A of the agent server 2.

Next, in the case in which a pair matching the input ID and password exists (step S415/Yes), authentication is successful, and therefore the control section 500 extracts agent IDs from the agent information DB 530 and presents (lists) the agent IDs on the general user auditing screen (step S418). Specifically, as illustrated in FIG. 27, for example, in an agent ID selection field 114 of an auditing screen 110a, a list of multiple agent IDs is displayed in pull-down format.

Next, when an agent ID is selected by the user (step S421), the control section 500 extracts utterances, triggers, and utterance probability levels associated with the agent ID selected by the user from the utterance DB 540, and presents (lists) the extracted information on the general user auditing screen (step S424). Specifically, as illustrated in FIG. 27, for example, in an utterance information adjustment field 115 on the general user auditing screen 110a, utterances (text indicating utterance content), triggers, and utterance probability levels are displayed. The utterance probability levels may be a numerical display (0.0 to 1.0), or a slide bar display as illustrated in FIG. 27. The user audits whether or not the already-registered utterances are appropriate to the agent, and if there is an inappropriate utterance, the user adjusts the "utterance probability level" slider to set the utterance probability level lower (step S427). At the initial value, the slider is displayed in the center (default value 0.5). Also, in the case of wanting to add a new utterance, it is also possible to input new utterances in the "New" fields at the bottom of the utterance information adjustment field 115.

Note that, as one example herein, the agent ID is used as the request information for requesting utterance data, but the present embodiment is not limited thereto, and for example, the user information, situation information, and the like may also be used as request information. For example, in the case in which situation information is specified by the user and transmitted from the client terminal 1, the control section 500 extracts utterance data triggered by the specified situation from the utterance DB 540, and replies to the client terminal 1.

Next, if a Finish button 116 on the general user auditing screen 110a is pressed by the user (step S430), the content that has been changed in the utterance information adjustment field 115 is transmitted to the agent server 2. On the basis of the changed content transmitted from the client terminal 1, the conversation DB generation section 50A checks whether or not the utterance probability level of each utterance has been changed (step S433).

Next, in the case in which the utterance probability level has been changed (step S433/Yes), the utterance probability level computation section 503 updates the utterance probability level of the corresponding utterance registered in the utterance DB 540 on the basis of the utterance probability level input by general users (step S436). The update of the utterance probability level is computed according to Formula 1 below, for example. As one example, Formula 1 below illustrates a computational formula for the case of updating by attaching importance to input by members of the fan club for the corresponding agent from among general users. Since fan club members have a better understanding of the personality of the agent character, the input utterance probability levels are considered to be highly reliable.

In Formula 1 below, W is a weight (for example, taken to be 0.05 in the case of a general user, and 0.5 in the case of a fan club member), Io is the old utterance probability level (0.0 to 1.0) registered in the utterance DB 540, Iu is the utterance probability level (0.0 to 1.0) input by the user, and In is the updated utterance probability level.

[Math. 1]

$$In = Io*(1-W) + Iu*W \quad \text{Formula 1}$$

Subsequently, the utterance data management section 502 writes the utterance probability level computed by the utterance probability level computation section 503 to the utterance DB 540 (step S439). Note that in the case in which the changed content is a newly added utterance, after executing the duplicate check illustrated in FIG. 24, the content is written to the utterance DB 540 if there are no duplicates.

(Auditing by Privileged Users)

Figure 28:
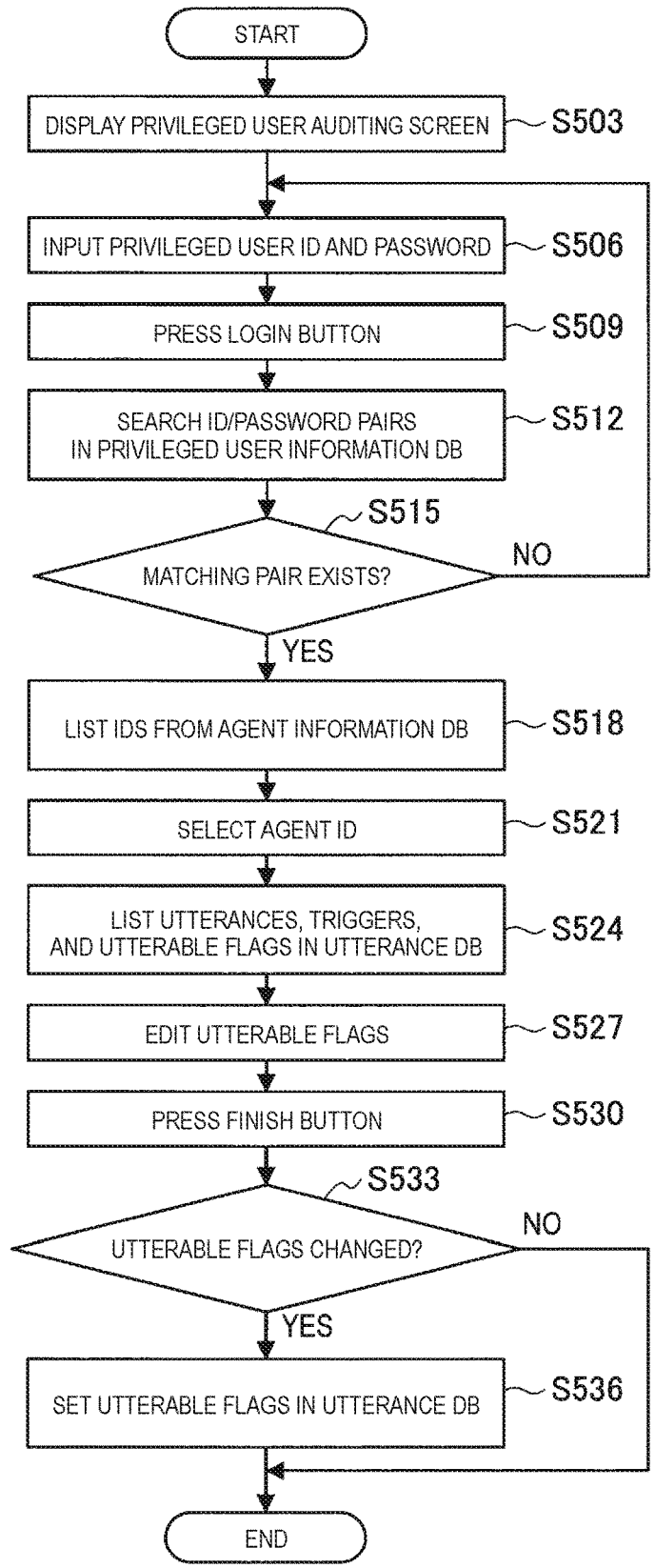
FIG. 28 is a flowchart illustrating a privileged user auditing process according to the present embodiment.

Next, the process of auditing by a user having special rights (privileged user) will be described with reference to FIG. 28. FIG. 28 is a flowchart illustrating the privileged user auditing process according to the present embodiment. The privileged user is expected to be the copyright holder, owner, or the like of an agent character, for example.

As illustrated in FIG. 28, first, the conversation DB generation section 50A of the agent server 2 displays a privileged user auditing screen generated by the screen generation section 501 on the client terminal 1 (step S503).

Next, when the user inputs a privileged user ID and password from the privileged user auditing screen (step S506) and presses a Login button (step S509), the conversation DB generation section 50A executes a user login process by the control section 500 on the basis of the input information (steps S512 to S515).

Specifically, the control section 500 searches pairs of IDs and passwords registered in the privileged user information DB 550 (step S512), and authenticates the user by determining whether or not a match with the pair of the ID and password input by the user exists (step S515). Herein, FIG. 29 illustrates an example of the privileged user auditing screen according to the present embodiment. As illustrated in FIG. 29, on an auditing screen 120, a privileged user ID input field 121, a password input field 122, and a Login button 123 are displayed. The user inputs a user ID into the privileged user ID input field 121 of the auditing screen 120, additionally inputs a password into the password input field 122, and selects the Login button 123. With this arrangement, the input privileged user ID and password are transmitted from the client terminal 1 to the conversation DB generation section 50A of the agent server 2.

Next, in the case in which a pair matching the input ID and password exists (step S515/Yes), authentication is successful, and therefore the control section 500 extracts agent IDs for which the user has special rights (agent IDs associated with the matching pair in the privileged user information DB 550) from the agent information DB 530 and presents (lists) the agent IDs on the privileged user auditing screen (step S518). Specifically, as illustrated in FIG. 29, for example, in an agent ID selection field 124 of the auditing screen 120, a list of agent IDs for which the user has special rights is displayed in pull-down format.

Next, when an agent ID is selected by the user (step S521), the control section 500 extracts utterances, triggers, and utterable flag information associated with the selected agent ID from the utterance DB 540, and presents (lists) the extracted information on the privileged user auditing screen (step S524). Specifically, as illustrated in FIG. 29, for example, in an utterance information adjustment field 125 on the privileged user auditing screen 120, utterances, triggers, and utterable flags are displayed. The utterable flag is displayed in a check box format, for example, and is displayed such that the box is checked in the case in which the utterable flag is "true". The privileged user audits whether or not the already-registered utterances are appropriate to the agent, and in the case of determining not to allow an utterance which is inappropriate to the agent, the privileged user selects the check box and unchecks the "utterable flag" (step S527). The unchecked utterance is controlled not to be output as an utterance of the agent, regardless of the numerical value of the utterance probability level.

Next, if a Finish button 126 on the privileged user auditing screen 120 is pressed by the user (step S530), the content that has been changed in the utterance information adjustment field 125 is transmitted to the agent server 2. On the basis of the changed content transmitted from the client terminal 1, the conversation DB generation section 50A checks whether or not the utterable flag of each utterance has been changed (step S533).

Next, in the case in which the utterable flag has been changed (step S533/Yes), the utterance data management section 502 sets the utterable flag changed by the privileged user in the utterance DB 540 (step S536). Specifically, for example, in the utterance information adjustment field 125 of the privileged user auditing screen 120, the utterable flag is set to "False" in the case of being unchecked, and is set to "true" in the case of being checked.

(4-2-3. Utterance Control Process)

Figure 30:
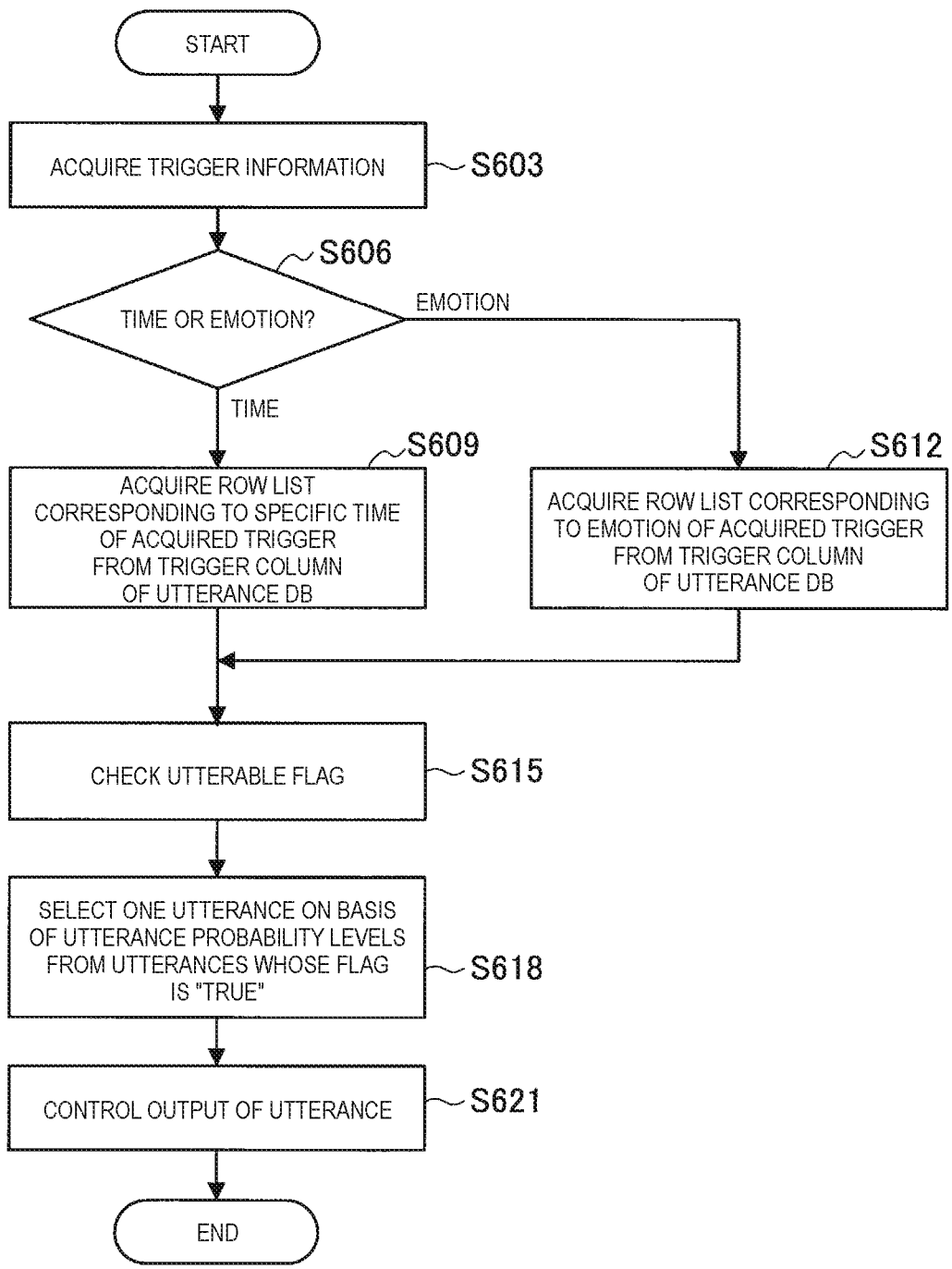
FIG. 30 is a flowchart illustrating an utterance control process according to the present embodiment.

Next, an utterance control process by the present embodiment will be described with reference to FIG. 30. FIG. 30 is a flowchart illustrating the utterance control process according to the present embodiment.

As illustrated in FIG. 30, first, the dialogue processing section 300A of the agent server 2 acquires trigger information (step S603). The trigger information is acquired from information obtained from a clock, a graphical user interface (GUI) (such as screen operation content, for example), a result of speech recognition on a user utterance, user behavior, biological information, or the like.

Next, in the case in which the trigger information is a time (step S606/time), the utterance generation section 360 acquires a row list corresponding to the specific time of the acquired trigger from the trigger column of the utterance data stored in the utterance DB 350 (step S609). For example, in the utterance DB 350, the data example of the utterance DB 540 illustrated in FIG. 18 is stored as the utterance data set of the character A, and in the case in which the trigger information is "12:00", a list of rows for which the trigger column is "12:00" (a row list of the utterances "It's noon", "Noon", "It is noon", "It is 12 o'clock", and "Yo it's lunchtime") is acquired.

On the other hand, in the case in which the trigger information is an emotion (step S606/emotion), a row list corresponding to the emotion of the acquired trigger is acquired from the trigger column of the utterance data stored in the utterance DB 350 (step S612). For example, in the utterance DB 350, the data example of the utterance DB 540 illustrated in FIG. 18 is stored as the utterance data set of the character A, and in the case in which the trigger information is "discouraged", a list of rows for which the trigger column is "emotion: discouraged" (a row list of the utterances "Cheer up", "Do your best", "I know you can do it", and "Please do your best") is acquired.

Next, the utterance generation section 360 checks each utterable flag (true/false) of the acquired row list (step S615).

Next, the utterance generation section 360 selects one utterance on the basis of the utterance probability level from the utterances whose utterable flag is "true" (step S618). Note that utterances whose utterable flag is "false" are not selected. Herein, regarding the process of selecting an utterance using the utterance probability level, a specific example of the case of selecting one from among three candidates, for example, will be described.

First, an utterance candidate list (A) is defined as below.
A=[{S1:R1}, {S2:R2}, {S3:R3}]
In the above formula,
Sn: utterance
Rn: utterance probability level
[ ]: array
{ }: dictionary
S: selected utterance
Provided that
R2'=R1+R2
R3'=R2'+R3
RND: random iumber in the range 0≤RND≤R3 the utterance generation section 360 selects
S1, if 0≤RND<R1
S2, if R1≤RND<R2'
S3, if R2'≤RND With this arrangement, there is a greater tendency for an utterance having a high utterance probability level to be chosen, while also including an element of uncertainty. It is also possible to make a selection only according to how high the utterance probability level is, but in this case, the same utterance is selected every time. For this reason, by weighting the utterance probability level and making a choice using a random number, it is possible to avoid selecting the same utterance every time while also taking the utterance probability level into account.

Subsequently, the dialogue processing section 300A controls the utterance selected by the utterance generation section 360 to be output as an utterance of the agent from the client terminal 1 (step S621). Specifically, the dialogue processing section 300A outputs the utterance data generated by the utterance generation section 360 to the phoneme data acquisition section 340, the phonemes of a specific agent are acquired by the phoneme data acquisition section 340, and the utterance data as well as the phoneme data are output to the speech agent I/F 20. Subsequently, the utterance data is converted to speech (for example, speech output by text-to-speech (TTS)) in the voice of the specific agent by the speech agent I/F 20, and output as an utterance of the specific agent from the client terminal 1 of the user.

5. Conclusion

As described above, the communication control system according to an embodiment of the present disclosure is capable of auditing the utterance data of an agent more flexibly.

Specifically, by collecting utterance data of agents from the general public in an attempt to enrich the utterance database, while also making it easy to utilize utterance data matched to the preferences of the general public, and additionally making it possible to eliminate utterance data that does not fit the impression of an agent easily, flexibility of auditing is achieved.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a CPU, ROM, and RAM built into the client terminal 1 or the agent server 2 described above to exhibit the functions of the client terminal 1 or the agent server 2. Also, a computer-readable storage medium storing the computer program is provided.

In addition, the embodiment described above illustrates a configuration in which various functions are realized by the agent server 2 on the Internet, but the present embodiment is not limited thereto, and at least part of the configuration of the agent server 2 may also be in the client terminal 1 (a smartphone, wearable terminal, or the like) of the user. Also, the entire configuration of the agent server 2 may be provided in the client terminal 1, and all processes may be executed on the client terminal 1.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:

a storage section that stores utterance data of an agent;

a communication section that receives request information transmitted from a client terminal and requesting utterance data of a specific agent from a user; and a control section that, when the request information is received through the communication section, replies to the client terminal with corresponding utterance data, and in accordance with feedback from the user with respect to the utterance data, updates an utterance probability level expressing a probability that the specific agent will utter utterance content indicated by the utterance data, and records the updated utterance probability level in association with the specific agent and the utterance content in the storage section.

(2)

The information processing system according to (1), in which the control section updates the utterance probability level after applying a weight depending on a rank set for the user.

(3)

The information processing system according to (1) or (2), in which the control section attaches, to the utterance data, an utterance availability flag indicating whether to allow or deny the specific agent uttering the utterance content indicated by the utterance data, in accordance with input of a user of a rank having a special privilege.

(4)

The information processing system according to any one of (1) to (3), in which the request information includes agent identification information, user identification information, situation information, or a keyword.

(5)

The information processing system according to any one of (1) to (4), in which the control section collects, through the communication section, utterance data input by a user which is desirable for a specific agent to utter, the utterance data being transmitted through a client terminal, and registers the utterance data in association with identification information of the specific agent in the storage section.

(6)

The information processing system according to any one of (1) to (5), in which the utterance probability level is set for each specific situation.

(7)

The information processing system according to (6), in which the specific situation information is a time, a place, a user condition, or a user emotion that acts as a trigger for an agent to utter utterance content indicated by corresponding utterance data.

(8)

The information processing system according to any one of (1) to (7), in which the control section acquires, through the communication section, trigger information having a possibility of becoming a trigger of an utterance of a specific agent, the trigger information being transmitted from a client terminal, and on a basis of the trigger information, selects corresponding utterance data while taking into account each utterance probability level from the utterance data of the specific agent, and replies to the client terminal.

(9)

The information processing system according to (8), in which the control section acquires a reaching of a specific time period as the trigger information, and takes into account time period information and the utterance probability level associated with each piece of utterance data of the specific agent, and selects utterance data consistent with the time period information.

(10)

The information processing system according to (8) or (9), in which the control section extracts, from among utterance data associated with the specific agent, utterance data allowed to be uttered according to an utterance availability flag input by a user of a rank having a special privilege, selects one piece of utterance data according to the utterance probability level attached to each piece of extracted utterance data, and replies to the client terminal.

(11)

An information processing method, executed by a processor, including:

storing utterance data of an agent in a storage section;

receiving, by a communication section, request information transmitted from a client terminal and requesting utterance data of a specific agent from a user; and executing control such that, when the request information is received through the communication section, the client terminal is replied to with corresponding utterance data, and in accordance with feedback from the user with respect to the utterance data, an utterance probability level expressing a probability that the specific agent will utter utterance content indicated by the utterance data is updated, and the updated utterance probability level is recorded in association with the specific agent and the utterance content in the storage section.

REFERENCE SIGNS LIST 1 client terminal
2 agent server
30 dialogue processing section
300, 300A dialogue processing section
310 question search section
320 response generation section
330 conversation DB
340 phoneme data acquisition section
350 utterance DB
360 utterance generation section
31 basic dialogue processing section
32 character A dialogue processing section
33 person B dialogue processing section
34 person C dialogue processing section
35 matching section
36 communication section
40 phoneme storage section
41 basic phoneme DB
42 character A phoneme DB
43 person B phoneme DB
44 person C phoneme DB 50, 50A conversation DB generation section
500 control section
501 screen generation section
502 utterance data management section
503 utterance probability level computation section
510 communication section
520 user information DB
530 agent information DB
540 utterance DB
550 privileged user information DB
60 phoneme DB generation section
70 advertisement insertion processing section
72 advertisement DB
80 feedback acquisition processing section
3 network
10 agent

The invention claimed is:

1. An information processing apparatus, comprising:
control circuitry configured to:
receive, from a user terminal, utterance data that is input using a first user identifier, the utterance data being for an agent to utter;
store the received utterance data in association with identification information of the agent in a memory; and
set an utterance availability flag in association with the received utterance data in the memory in accordance with a setting that is input using a second user identifier, the utterance availability flag indicating whether to allow the agent to utter the utterance data, the second user identifier being associated with a privilege to set the utterance availability flag, and the first user identifier being associated with no privilege to set the utterance availability flag.

2. The information processing apparatus according to claim 1, wherein the control circuitry is configured to:
output the utterance data for the agent to utter in a case that the utterance data is selected to be output in response to a request from a client terminal and that the utterance availability flag indicates that the agent is allowed to utter the utterance data.

3. The information processing apparatus according to claim 2, wherein the control circuitry is configured to:
after the utterance data is output for the agent to utter, receive a feedback with respect to the utterance data from the client terminal; and
update an utterance probability level stored in the memory in association with the utterance data according to the received feedback, the utterance probability level representing a probability of selecting the utterance data for output for the agent to utter.

4. The information processing apparatus according to claim 3, wherein the control circuitry is configured to update the utterance probability level according to a weight associated with a user of the client terminal.

5. The information processing apparatus according to claim 2, wherein the request includes the agent identification information of the agent.

6. The information processing apparatus according to claim 5, wherein the request further includes user identification information identifying a user of the client terminal and triggering information.

7. The information processing apparatus according to claim 1, wherein the control circuitry is configured to:
store an utterance probability level in the memory in association with the utterance data, the utterance probability level representing a probability of selecting the utterance data for output for the agent to utter.

8. The information processing apparatus according to claim 1, wherein the control circuitry is configured to:
store a triggering condition in the memory in association with the utterance data.

9. The information processing apparatus according to claim 8, wherein the triggering condition is configured based on one or more of a time, a place, a user condition, or a user emotion.

10. An information processing method, comprising:
receiving, from a user terminal by control circuitry of an information processing apparatus, utterance data that is input using a first user identifier, the utterance data being for an agent to utter;
storing the received utterance data in association with identification information of the agent in a memory; and
setting, by the control circuitry of the information processing apparatus, an utterance availability flag in association with the received utterance data in the memory in accordance with a setting that is input using a second user identifier, the utterance availability flag indicating whether to allow the agent to utter the utterance data, the second user identifier being associated with a privilege to set the utterance availability flag, and the first user identifier being associated with no privilege to set the utterance availability flag.

11. The information processing method according to claim 10, further comprising:
outputting the utterance data for the agent to utter in a case that the utterance data is selected to be output in response to a request from a client terminal and that the utterance availability flag indicates that the agent is allowed to utter the utterance data.

12. The information processing method according to claim 11, further comprising:
after the utterance data is output for the agent to utter, receiving a feedback with respect to the utterance data from the client terminal; and
updating an utterance probability level stored in the memory in association with the utterance data according to the received feedback, the utterance probability level representing a probability of selecting the utterance data for output for the agent to utter.

13. The information processing method according to claim 12, wherein the updating the utterance probability level is performed according to a weight associated with a user of the client terminal.

14. The information processing method according to claim 11, wherein the request includes the agent identification information of the agent.

15. The information processing method according to claim 14, wherein the request further includes user identification information identifying a user of the client terminal and triggering information.

16. The information processing method according to claim 10, further comprising:
storing an utterance probability level in the memory in association with the utterance data, the utterance probability level representing a probability of selecting the utterance data for output for the agent to utter.

17. The information processing method according to claim 10, further comprising:
storing a triggering condition in the memory in association with the utterance data.

18. The information processing method according to claim 17, wherein the triggering condition is configured based on one or more of a time, a place, a user condition, or a user emotion.

19. A non-transitory computer-readable medium storing a program which when executed by processing circuitry of an apparatus causes the apparatus to perform a process comprising:
- receiving, from a user terminal, utterance data that is input using a first user identifier, the utterance data being for an agent to utter;
- storing the received utterance data in association with identification information of the agent in a memory; and
- setting an utterance availability flag in association with the received utterance data in the memory in accordance with a setting that is input using a second user identifier, the utterance availability flag indicating whether to allow the agent to utter the utterance data, the second user identifier being associated with a privilege to set the utterance availability flag, and the first user identifier being associated with no privilege to set the utterance availability flag.

20. The non-transitory computer-readable medium according to claim 19, wherein the process further comprises:
- outputting the utterance data for the agent to utter in a case that the utterance data is selected to be output in response to a request from a client terminal and that the utterance availability flag indicates that the agent is allowed to utter the utterance data.

* * * * *